(12) United States Patent
Doi

(10) Patent No.: US 7,110,795 B2
(45) Date of Patent: Sep. 19, 2006

(54) RADIO APPARATUS, METHOD FOR RECEIVING ITS SIGNAL, METHOD FOR MEASURING ITS FILTER COEFFICIENT, AND PROGRAM FOR MEASURING ITS FILTER COEFFICIENT

(75) Inventor: Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 280 days.

(21) Appl. No.: 10/487,705

(22) PCT Filed: Aug. 20, 2002

(86) PCT No.: PCT/JP02/08391

§ 371 (c)(1),
(2), (4) Date: Feb. 26, 2004

(87) PCT Pub. No.: WO03/021813

PCT Pub. Date: Mar. 13, 2003

(65) Prior Publication Data

US 2004/0209652 A1 Oct. 21, 2004

(30) Foreign Application Priority Data

Aug. 31, 2001 (JP) .............................. 2001-263883

(51) Int. Cl.
*H04M 1/00* (2006.01)
*H04B 1/00* (2006.01)

(52) U.S. Cl. .................. 455/562.1; 455/63.1; 455/561

(58) Field of Classification Search ................ 455/561, 455/562.1, 130, 132, 133, 140, 143, 272, 455/269, 193.1; 343/751, 835, 834, 836; 375/345, 346, 350
See application file for complete search history.

(56) References Cited

U.S. PATENT DOCUMENTS

| 6,141,371 A * | 10/2000 | Holmes et al. ............. 375/130 |
| 2003/0007553 A1* | 1/2003 | Fifield ........................ 375/232 |
| 2004/0001554 A1* | 1/2004 | Sun et al. .................... 375/260 |
| 2004/0008614 A1* | 1/2004 | Matsuoka et al. .......... 370/203 |
| 2004/0120421 A1* | 6/2004 | Filipovic ..................... 375/316 |
| 2005/0129151 A1* | 6/2005 | Kobayashi et al. ......... 375/345 |
| 2005/0147155 A1* | 7/2005 | Carson ........................ 375/147 |

FOREIGN PATENT DOCUMENTS

CN 1242651 A 1/2000

(Continued)

OTHER PUBLICATIONS

N. Kikuma, "Chapter 3: MMSE Adaptive Array" in "Adaptive Signal Processing by Array Antenna", *Kagaku Gijutsu Shuppan*, Nov. 1998, pp. 35-49 (Partial English Translation), no date available.

*Primary Examiner*—Sonny Trinh
(74) *Attorney, Agent, or Firm*—McDermott Will & Emery LLP

(57) ABSTRACT

Corresponding to antennas analog RF circuits are provided and their outputs are converted by A/D converters to digital signals. Subsequent thereto and preceding an adaptive array processing, correction filters are arranged. Each correction filter has a filter coefficient for compensating for a difference between a characteristic of an analog RF circuit corresponding thereto and an ideal circuit characteristic. Thus an error of a characteristic between the analog RF circuits can be compensated for. The series of operations are implemented by software.

20 Claims, 18 Drawing Sheets

FOREIGN PATENT DOCUMENTS

| | | |
|---|---|---|
| CN | 1300466 A | 6/2001 |
| EP | 0 700 116 A2 | 3/1996 |
| EP | 1 143 559 A1 | 10/2001 |
| JP | 4-302543 A | 10/1992 |
| JP | 7-170117 A | 7/1995 |
| JP | 09-214291 | 8/1997 |
| JP | 11-8507 A | 1/1999 |
| JP | 11-046180 | 2/1999 |
| JP | 11-101828 A | 4/1999 |
| JP | 2001-144825 | 5/2001 |
| JP | 2001-156688 A | 6/2001 |
| WO | WO 99/57820 | 11/1999 |
| WO | WO 00/59111 | 10/2000 |

* cited by examiner

RADIO APPARATUS, METHOD FOR RECEIVING ITS SIGNAL, METHOD FOR MEASURING ITS FILTER COEFFICIENT, AND PROGRAM FOR MEASURING ITS FILTER COEFFICIENT

TECHNICAL FIELD

The present invention relates generally to radio apparatuses and their signal reception methods and filter coefficient measurement methods and programs, and particularly to those digitally compensating for an error of a characteristic of analog circuits.

BACKGROUND ART

In recent years in a rapidly developing mobile communication system (the Personal Handyphone System (PHS) for example) there has been proposed a system in which when a radio base station and a mobile terminal device communicate, the radio base station employs adaptive array processing to extract a signal received from a specific, desired mobile terminal device.

Adaptive array processing is a processing which calculates from a signal received from a mobile terminal device a weight vector formed of reception coefficients (weights) for respective antennas of the radio base station and provides adaptive control to accurately extract a signal received from a specific mobile terminal device.

The radio base station is provided with a reception weight vector calculator calculating such a weight vector for each symbol of a received signal and the calculator provides a processing to converge a weight vector to reduce a square of an error between a sum of complex multiplications of a received signal and a calculated weight vector, and a known reference signal, i.e., an adaptive array processing converging directivity of reception from a specific mobile terminal device.

In the adaptive array processing, such weight vector convergence is provided adaptively for example as time elapses and a signal's electric wave propagation path varies in characteristics, and a received signal has an interference component, noise and the like removed therefrom to extract a signal received from a specific mobile terminal device.

FIG. 17 is a functional block diagram for functionally illustrating an adaptive array processing performed in a radio base station's digital signal processor (DSP) by software.

With reference to FIG. 17, the radio base station has a plurality of antennas, for example four antennas A1–A4 receiving signals from mobile terminal device, respectively. The received signals undergo a variety of analog signal processing, as described hereinafter, in analog RF circuits 1–4 and are converted to digital signals by A/D converters 5–8, respectively.

These digital signals are fed to the radio base station's DSP and the FIG. 17 block diagram is then followed to provide the adaptive array processing by software.

With reference to FIG. 17, the received signals converted by A/D converters 5–8 to digital signals form a reception signal vector, which is in turn fed to multipliers M1–M4, respectively, each at one input, and also to reception weight vector calculator 11.

Reception weight vector calculator 11 uses an adaptive array algorithm described hereinafter to calculate a weight vector formed of weights for respective antennas and feeds the weights to multipliers M1–M4, respectively, each at the other input, to provide complex multiplications thereof by the vector of the signals received from the corresponding antennas. An adder 9 adds the complex multiplications together, which forms an array output signal.

The sum of the complex multiplications fed as the array output signal is also fed to reception weight vector calculator 11.

Reception weight vector calculator 11 receives a known reference signal d(t) previously stored in memory 10 and the signal is used in the calculation of a weight vector by the adaptive array algorithm. Reference signal d(t) is a known signal common to all users that is included in a signal received from a mobile terminal device, and for example for the PHS it is a section of the received signal that corresponds to a preamble (PR) and unique word (UW) configured of a known bit string.

Furthermore, reception weight vector calculator 11 receives the array output signal and the signal is used in the calculation of a weight vector by the adaptive array algorithm.

The reception weight vector calculator 11 employs Recursive Least Squares (RLS) algorithm, Sample Matrix Inversion (SMI) algorithm, or other similar adaptive array algorithm.

The RLS, SMI and other similar algorithms are a well known technique in the field of adaptive array processing, for example as specifically described by Nobuyoshi Kikuma, Adaptive Signal Processing by Array Antenna, Kagaku Gijutsu Shuppan, pp. 35–49, "Chapter 3 MMSE Adaptive Array." Accordingly it will not be described.

Reference will now be made to FIG. 18, which is a schematic block diagram showing a specific configuration of analog RF circuit 1 shown in FIG. 17. Analog RF circuits 2–4 are identical in configuration to analog RF circuit 1 and accordingly will neither shown nor described.

With reference to FIG. 18, analog RF circuit 1 includes an amplifier 1a amplifying a radio frequency (RF) signal of an RF band received at antenna A1, a frequency mixer 1b using a local oscillation output received from a local oscillator (not shown) to convert in frequency the RF signal of the RF band to a baseband signal of a baseband, a bandpass filter BPF1c limiting an output of frequency converter 1c in bandwidth, and an amplifier 1d amplifying a baseband signal of a baseband output from BPF1c.

Strictly, the RF signal of the RF band is initially converted by a first frequency mixer to an intermediate frequency (IF) signal of an IF band and then by a second frequency mixer to a baseband signal of a baseband. In FIG. 18, frequency mixer 1b represents such first and second frequency mixers collectively.

As can be seen from FIG. 18, analog RF circuits 1–4 are each configured of analog circuit components such as amplifiers 1a, 1d, frequency mixer 1b and filter 1c. However, because of variations in production, the analog RF circuits, configured of the same amplifiers, the same frequency mixer and the same filters, still provide different frequency characteristics of phase and amplitude and it is difficult to match the characteristics between the analog RF circuits.

Consequently, analog RF circuits 1–4 of signal streams corresponding to antennas A1–A4, respectively, would provide different frequency characteristics of phase and amplitude.

More specifically, if antennas A1–A4 receive the same signal, their respective analog RF circuits 1–4 having different frequency characteristics output signals having different waveforms. In other words, a waveform output through a frequency characteristic of each analog RF circuit has distortion relative to that output through an ideal characteristic.

That waveforms output from analog RF circuits 1–4, respectively, have distortion is equivalent to that there exists an interference component in an input signal for the adaptive array processing.

Signals of the streams of antennas A1–A4, respectively, having interference components therein from the outset would contribute to a significantly impaired ability of the radio base station employing an adaptive array to reduce the interference components.

An object of the present invention is therefore to provide a radio apparatus and its signal reception method and filter coefficient measurement method and program that can correct distortion in waveform of a received signal by compensating for an error of a characteristic between streams of received signals that results from an error of a characteristic of an analog circuit.

Another object of the present invention is to provide a radio apparatus and its signal reception method and filter coefficient measurement method and program that can provide an enhanced ability to reduce an interference component by adaptive array processing by compensating for an error of a characteristic between streams of received signals resulting from an error of a characteristic of an analog circuit, for each stream by means of a digital filter.

DISCLOSURE OF THE INVENTION

The present invention in one aspect provides a radio apparatus using a plurality of antennas to receive a signal, including: a plurality of analog circuits, a plurality of analog-digital converters, a plurality of filter means, and digital signal extraction means. The plurality of analog circuits are provided to correspond to the plurality of antennas to subject signals received at the plurality of antennas, respectively, to an analog signal processing. The plurality of analog-digital converters receive signals from the plurality of analog circuits, respectively, to convert the signals to digital signals. The plurality of filter means receive the digital signals from the plurality of analog-digital converters, respectively, to filter the digital signals to compensate for distortion in waveform resulting from a difference of a characteristic between the plurality of analog circuits. The digital signal extraction means receives signals from the plurality of filter means, respectively, to subject the signals to a digital signal processing to extract a received signal.

Preferably the plurality of filter means are each a digital filter having a characteristic to compensate for a difference between a characteristic of the analog circuit corresponding thereto and an ideal circuit characteristic.

Preferably the digital filter is an FIR filter.

Preferably the digital signal extraction means is an adaptive array processing circuit employing an adaptive array processing to extract a received signal.

The present invention in another aspect provides a method of receiving a signal in a radio apparatus having a plurality of antennas, the radio apparatus including a plurality of analog circuits provided to correspond to the plurality of antennas to subject signals received at the plurality of antennas, respectively, to an analog signal processing, and a plurality of analog-digital converters receiving signals from the plurality of analog circuits, respectively, to convert the signals to digital signals. The method includes the steps of: filtering the digital signals output from the plurality of analog-digital converters to compensate for distortion in waveform resulting from a difference of a characteristic between the plurality of analog circuits; and subjecting the filtered digital signals to a digital signal processing to extract a received signal.

Preferably the step of filtering is digital-filtering accompanied by a characteristic for compensating for a difference between a characteristic of the analog circuit corresponding thereto and an ideal circuit characteristic.

Preferably the step of subjecting is a processing employing an adaptive array processing to extract a received signal.

The present invention in still another aspect provides a method of measuring a filter coefficient of a radio apparatus using a plurality of antennas to receive a signal, the radio apparatus including a plurality of analog circuits, a plurality of analog-digital converters, a plurality of filter means, and digital signal extraction means. The plurality of analog circuits are provided to correspond to the plurality of antennas to subject signals received at the plurality of antennas, respectively, to an analog signal processing. The plurality of analog-digital converters receive signals from the plurality of analog circuits, respectively, to convert the signals to digital signals. The a plurality of filter means receive the digital signals from the plurality of analog-digital converters, respectively, to filter the digital signals to compensate for distortion in waveform resulting from a difference of a characteristic between the plurality of analog circuits. The digital signal extraction means receive signals from the plurality of filter means, respectively, to subject the signals to a digital signal processing to extract a received signal. The method includes the steps of: determining a transmission frequency compensating for a frequency offset in the plurality of antennas; determining a sampling-timing allowing a sampling error in the analog-digital converter to have an optimal value; and calculating a filter coefficient of the filter means from a signal of the transmission frequency determined and the sampling-timing determined.

Preferably the plurality of filter means are each a digital filter having a characteristic to compensate for a difference between a characteristic of the analog circuit corresponding thereto and an ideal circuit characteristic.

Preferably the step of determining a transmission frequency includes the steps of: allowing a transmit signal of a variable transmission frequency to be received at the plurality of antennas; measuring a frequency offset of the transmit signal received at the plurality of antennas; and determining a transmission frequency allowing the measured frequency offset to have no more than a predetermined value. The step of determining a sampling-timing includes the steps of: allowing a transmit signal to be received at the plurality of antennas; sequentially varying a sampling-timing at the analog-digital converter; for each the sampling-timing varied, measuring and storing a sampling error of a received signal extracted by the digital signal extraction means; and determining a sampling-timing allowing the sampling error to be minimized.

Preferably the step of calculating a filter coefficient includes the steps of: allowing a signal of the determined transmission frequency to be received at each of the plurality of antennas; and subjecting a symbol of the received signal to an adaptive array processing as a tap input to calculate a filter coefficient corresponding to a respective tap input.

Preferably the digital signal extraction means is an adaptive array processing circuit employing an adaptive array processing to extract a received signal.

The present invention in still another aspect provides a method of measuring a filter coefficient of a radio apparatus using a plurality of antennas to receive a signal, the radio apparatus including a plurality of analog circuits, a plurality of analog-digital converters, a plurality of filter means, and digital signal extraction means. The a plurality of analog circuits are provided to correspond to the plurality of antennas to subject signals received at the plurality of antennas, respectively, to an analog signal processing. The plurality of analog-digital converters receive signals from the plurality of analog circuits, respectively, to convert the signals to digital signals. The plurality of filter means receive the digital signals from the plurality of analog-digital converters, respectively, to filter the digital signals to compensate for distortion in waveform resulting from a difference of a characteristic between the plurality of analog circuits. The digital signal extraction means receives signals from the plurality of filter means, respectively, to subject the signals to a digital signal processing to extract a received signal. The method includes the steps of: determining whether a signal received from a mobile terminal at the plurality of antennas satisfies a predetermined condition; holding a signal received from a mobile terminal at the plurality of antennas, the mobile device satisfying the predetermined condition; and calculating a filter coefficient of the filter means of the signal received and held.

Preferably the plurality of filter means are each a digital filter having a characteristic to compensate for a difference between a characteristic of the analog circuit corresponding thereto and an ideal circuit characteristic.

Preferably the step of calculating a filter coefficient includes the step of subjecting a symbol of the held, received signal to an adaptive array processing as a tap input to calculate a filter coefficient corresponding to a respective tap input.

Preferably the digital signal extraction means is an adaptive array processing circuit employing an adaptive array processing to extract a received signal.

The present invention in still another aspect provides a program to measure a filter coefficient of a radio apparatus using a plurality of antennas to receive a signal, the radio apparatus including a plurality of analog circuits, a plurality of analog-digital converters, a plurality of filter means, and digital signal extraction means. The plurality of analog circuits are provided to correspond to the plurality of antennas to subject signals received at the plurality of antennas, respectively, to an analog signal processing. The plurality of analog-digital converters receive signals from the plurality of analog circuits, respectively, to convert the signals to digital signals. The plurality of filter means receive the digital signals from the plurality of analog-digital converters, respectively, to filter the digital signals to compensate for distortion in waveform resulting from a difference of a characteristic between the plurality of analog circuits. The digital signal extraction means receives signals from the plurality of filter means, respectively, to subject the signals to a digital signal processing to extract a received signal. The program causes a computer to effect the steps of: determining whether a signal received from a mobile terminal at the plurality of antennas satisfies a predetermined condition; holding a signal received from a mobile terminal at the plurality of antennas, the mobile device satisfying the predetermined condition; and calculating a filter coefficient of the filter means of the signal received and held.

Preferably the plurality of filter means are each a digital filter having a characteristic to compensate for a difference between a characteristic of the analog circuit corresponding thereto and an ideal circuit characteristic.

Preferably the step of calculating a filter coefficient includes the step of subjecting a symbol of the held, received signal to an adaptive array processing as a tap input to calculate a filter coefficient corresponding to a respective tap input.

Preferably the digital signal extraction means is an adaptive array processing circuit employing an adaptive array processing to extract a received signal.

Thus in accordance with the present invention in a radio apparatus a plurality of filter means digitally compensating for a difference of a characteristic between a plurality of analog circuits subjecting a signal received at a plurality of antennas to an analog processing can be provided subsequent to a corresponding analog-digital converter so that the digital signal extraction means can receive an input without an interference component existing therein.

Furthermore in accordance with the present invention a plurality of filter means digitally compensating for a difference of a characteristic between analog circuits can be provided with a filter coefficient accurately determined for example prior to shipment of a radio apparatus under a condition with a frequency offset corrected and a timing of sampling corrected.

Furthermore in accordance with the present invention a plurality of filter means digitally compensating for a difference of a characteristic between analog circuits can be provided with a filter coefficient accurately determined for example in a shipped radio apparatus by selecting a satisfactory signal received from a mobile terminal and using the selected signal for calculation.

BEST MODES FOR CARRYING OUT THE INVENTION

Figure 1:
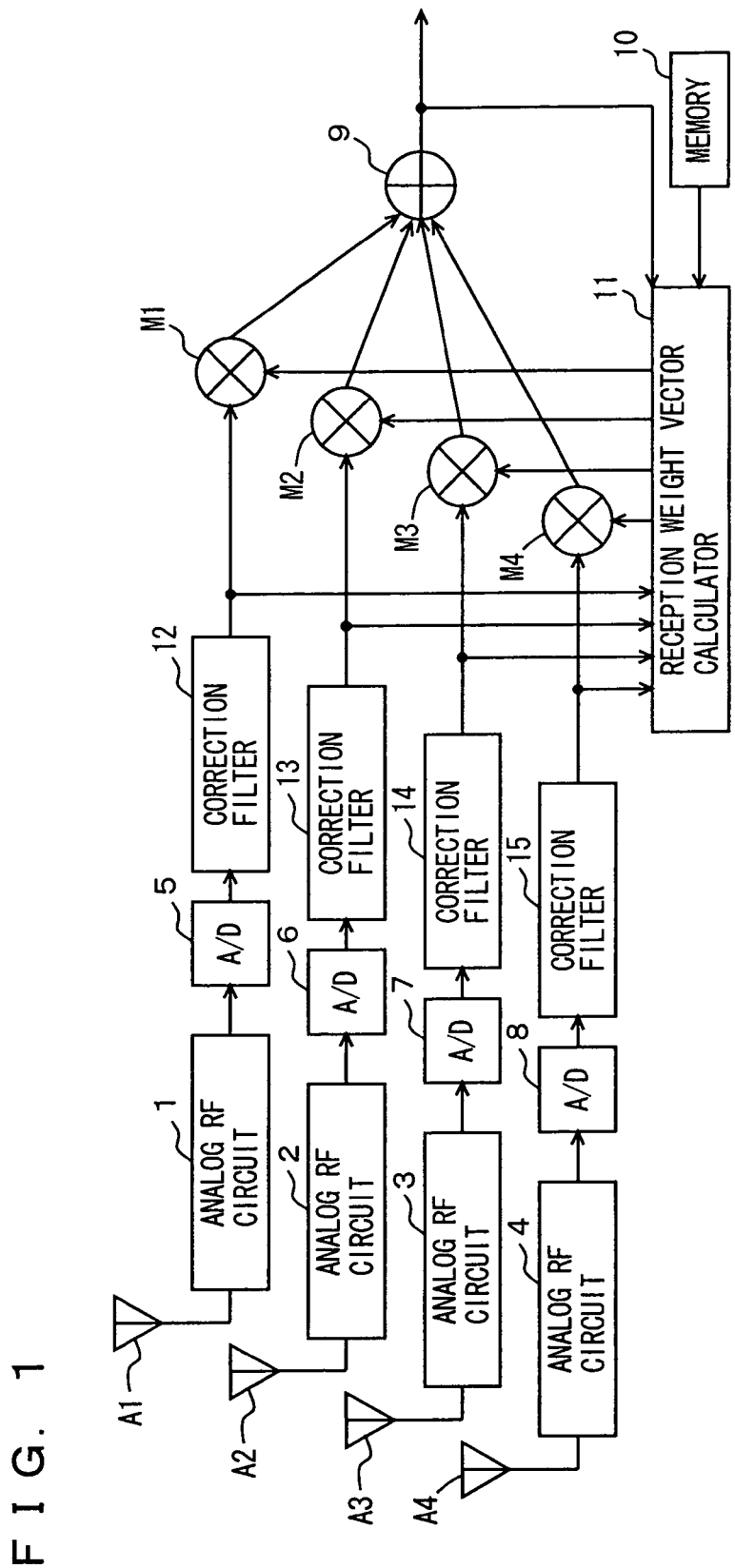
FIG. 1 is a functional block diagram showing a configuration of a system of a radio base station in accordance with the present invention in a first embodiment.

Hereinafter the present invention in embodiments will be described with reference to the drawings more specifically. In the figures, like components are denoted by like reference characters.

FIRST EMBODIMENT

FIG. 1 is a functional block diagram representing a configuration of a system of a radio base station in accordance with the present invention in a first embodiment, in particular for illustrating functionally a processing effected by a DSP of a radio station by software.

Figure 17:
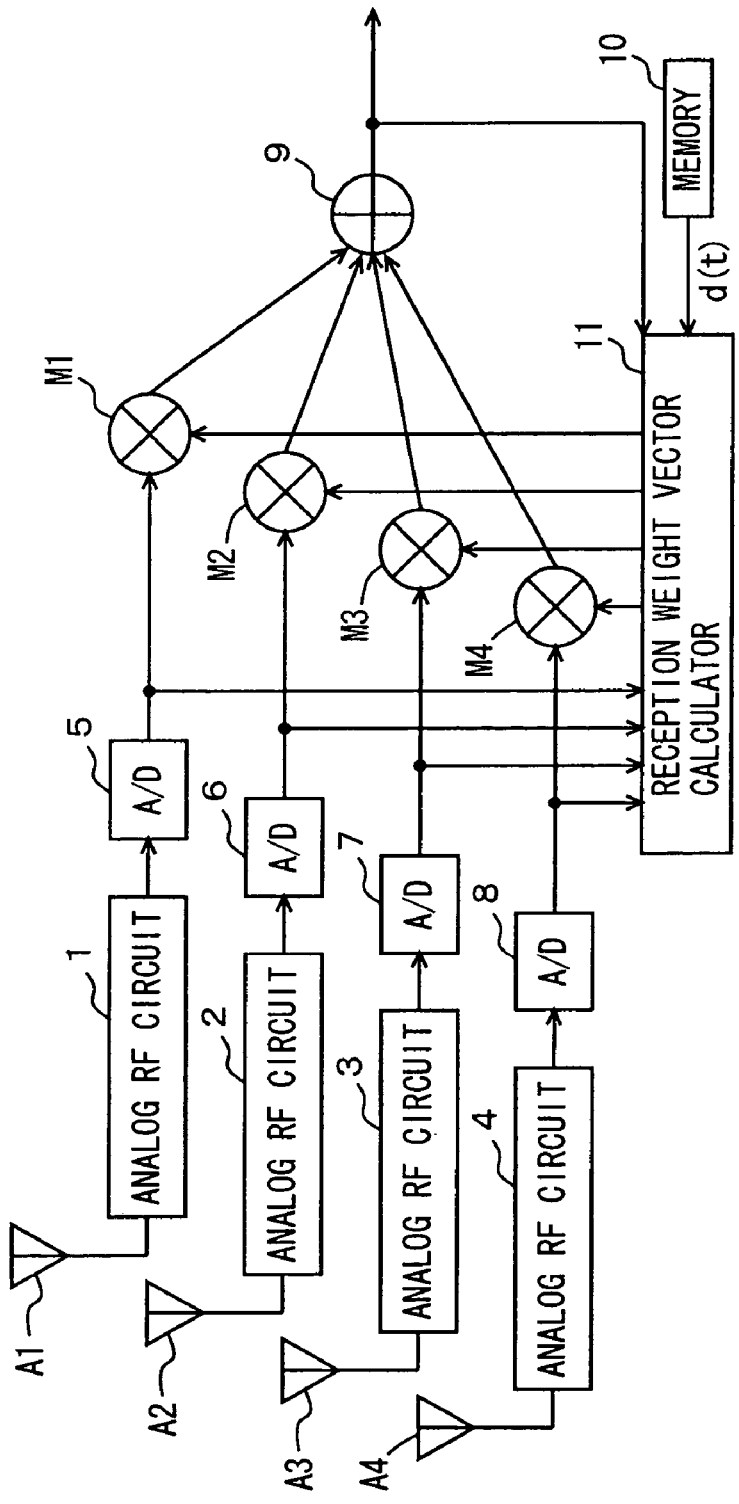
FIG. 17 is a functional block diagram showing a configuration of a system of a radio base station as conventional.
Figure 18:
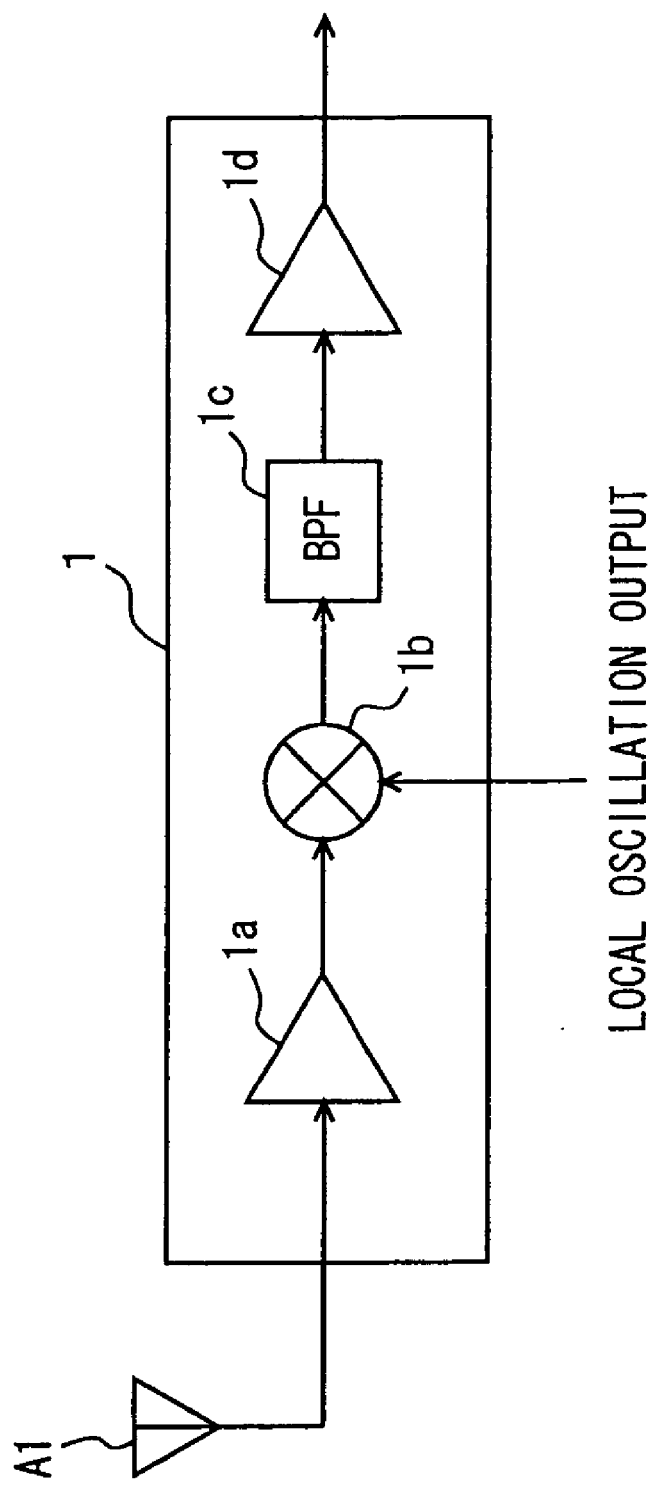
FIG. 18 is a block diagram showing a configuration of an analog RF circuit shown in FIG. 17.

The configuration of the radio base station shown in FIG. 1 is identical to that of the conventional radio base station shown in FIG. 17, except the following:

At a stage subsequent to A/D converters 5–8 and preceding adaptive array processing provided by the DSP (not shown) there are inserted correction filters 12–15 each configured of a digital filter.

Correction filters 12–15 are each a digital filter having a characteristic (a filter coefficient, i.e., a tap coefficient) compensating for a difference between a circuit characteristic (e.g., frequency characteristic of phase and amplitude) of a corresponding one of analog RF circuits 1–4 and a predetermined, ideal circuit characteristic.

The correction filters having such a characteristic that are inserted in the four signal streams corresponding to antennas A1–A4 can compensate for an analog circuit characteristic error between the streams and correct distortion in waveform included in an input signal of each signal stream. As a result, an ability in the subsequent adaptive array processing to reduce an interference component can be enhanced.

Figure 2:
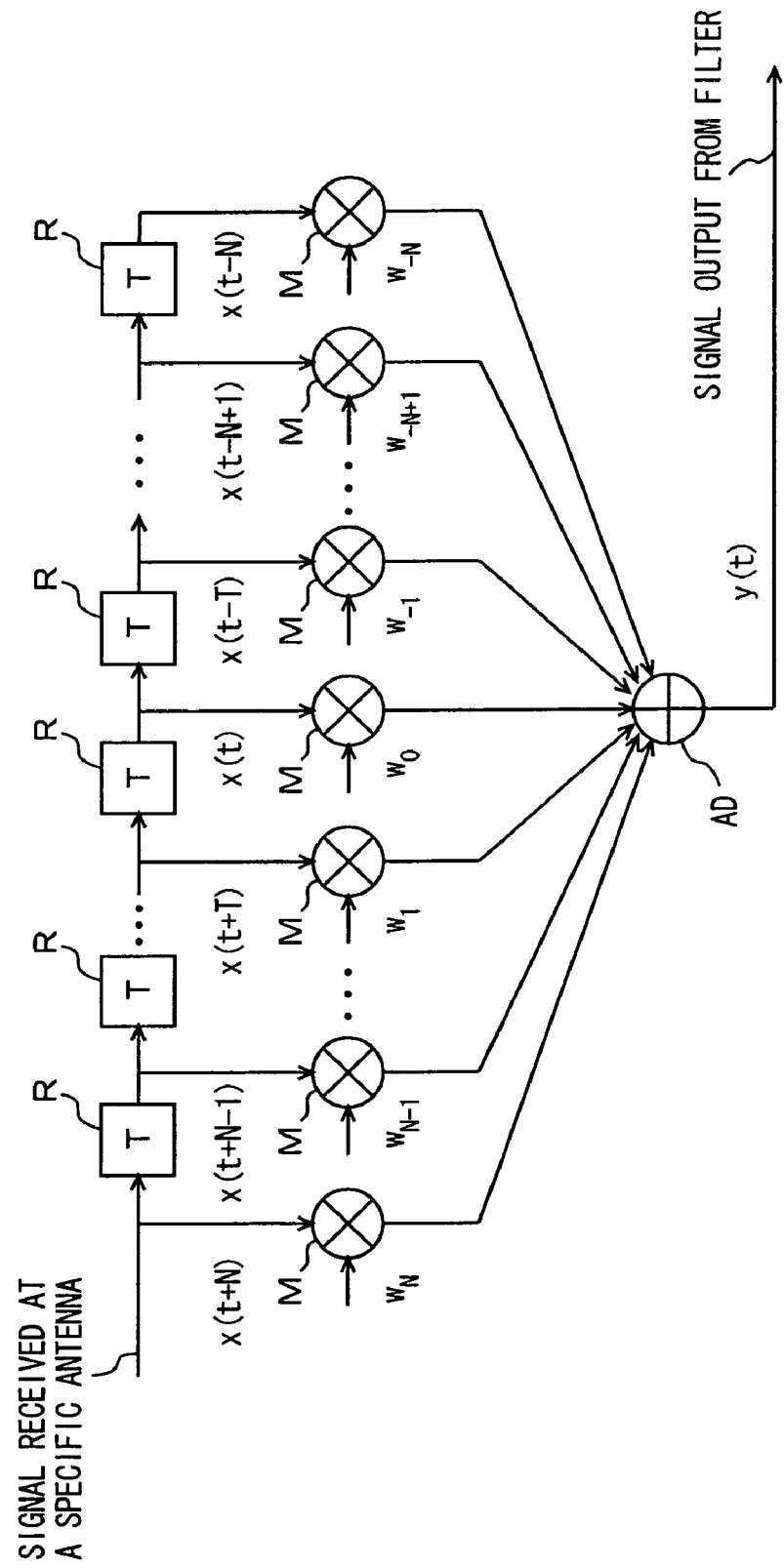
FIG. 2 is a block diagram showing a configuration of the correction filter shown in FIG. 1.

FIG. 2 is a block diagram showing a specific configuration of one of correction filters 12–15 of FIG. 1 that corresponds to a signal type. Note that correction filters 12–15 are identical in configuration.

The correction filter shown in FIG. 2 is configured as a well known, Finite-Duration Impulse Response (FIR) filter as one example of a digital filter.

With reference to FIG. 2, samples T of a received signal of a signal stream corresponding to an antenna are sequentially input to a shift register formed of 2N cascaded registers Rs, each holding one sample sequentially, wherein N represents a positive integer.

2N registers Rs are provided with 2N+1 inputs/outputs, which correspond to 2N+1 samples (referred to as tap outputs) $x(t+N)$, $x(t+N-1)$, ..., $x(t+T)$, $x(t)$, $x(t-T)$, ..., $x(t-N+1)$, $x(t-N)$ fed to 2N+1 multipliers Ms, respectively, each at one input.

2N+1 multipliers Ms have their respective other inputs receiving from a memory (not shown) filter coefficients (also referred to as tap coefficients) $W_N$, $W_{N-1}$, ..., $W_1$, $W_0$, $W_{-1}$, ..., $W_{-N+1}$, $W_{-N}$ corresponding to 2N+1 weight information unique to the correction filter.

2N+1 multipliers Ms multiply the 2N+1 tap outputs by the 2N+1 tap coefficients and the resultant multiplications are added together by an adder AD and output as an output signal y(t) of the correction filter.

Note that the 2N+1 tap coefficients input to 2N+1 multipliers Ms, respectively, at their respective other inputs are set to compensate for an error of a characteristic between the signal streams. How a tap coefficient is determined will be described hereinafter more specifically.

Figure 3:
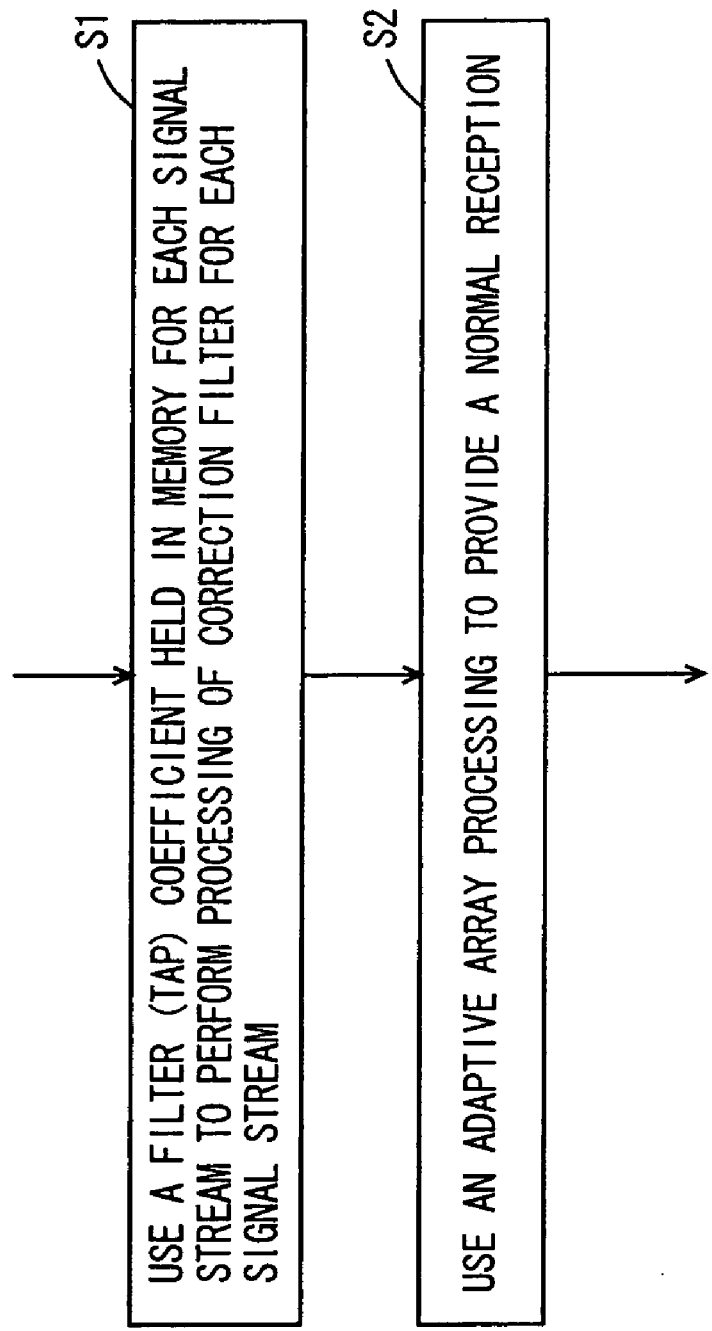
FIG. 3 is a flow chart of an operation of the radio base station in the first embodiment shown in FIG. 1.

FIG. 3 is a flow chart of a basic operation of the radio base station in the first embodiment shown in FIG. 1.

With reference to FIG. 3, received signals of the signal streams corresponding to antennas A1–A4 of FIG. 1 are each digitally filtered by a corresponding correction filer using a filter coefficient (a tap coefficient), held in a memory (not shown), of the corresponding signal stream (compensation for an error of a characteristic) (step S1).

The received signal having filtered is then subjected to the adaptive array processing by multipliers M1–M4, adder 9, memory 10 and reception weight vector calculator 11 to effect a normal reception process (step S2).

Thus in the first embodiment, as shown in FIGS. 1–3, in a radio base station a plurality of correction filters (digital filters) digitally compensating for a difference of a frequency characteristic between a plurality of analog RF circuits are provided at a stage subsequent to corresponding analog/digital converters and preceding adaptive array processing to prevent an input signal of the adaptive array processing from having an interference component therein. An ability to reduce an interference component by the adaptive array processing can be enhanced.

SECOND EMBODIMENT

The filter coefficients (tap coefficients) of correction filters 12–15 used in the radio base station of the first embodiment are measured (determined), as described hereinafter.

The filter coefficient can be measured in a factory before shipment of the radio station or automatically measured in the shipped radio base station in operation.

Initially as the second embodiment a filter coefficient measurement effected before shipment of the radio base station will be described.

Figure 4:
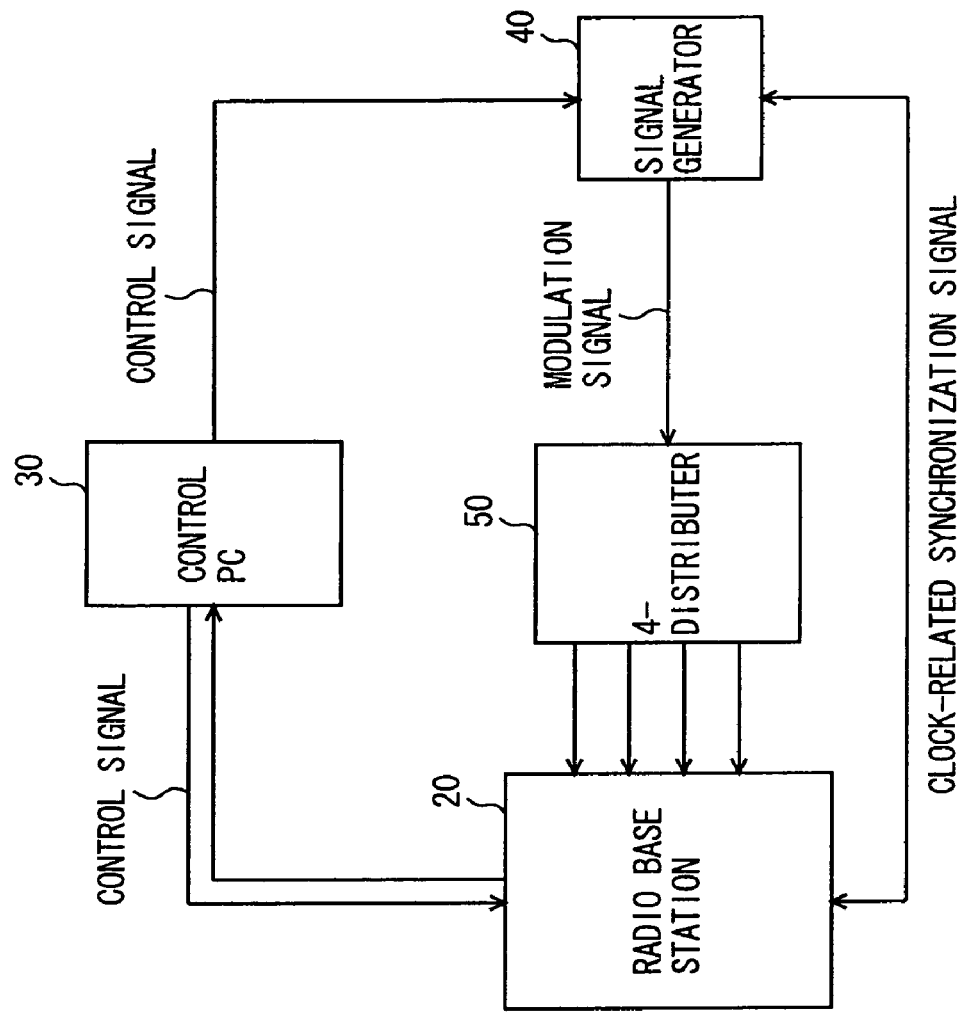
FIG. 4 is a schematic block diagram showing a configuration of a system in accordance with the present invention in a second embodiment for measuring a filter coefficient before shipment of a radio base station.

FIG. 4 is a schematic block diagram showing a configuration of a system in the second embodiment for measuring a filter coefficient before the radio base station is shipped.

With reference to FIG. 4, to measure a filter coefficient before shipment, a signal generator (SG) 40 generates a burst modulation signal and a 4-distributor 50 distributes the generated burst modulation signal to four which are in turn fed through cables, respectively, to a radio base station 20 at four antennas (not shown). Between radio base station 20 and SG40 clocks are synchronized to stabilize operation.

A personal computer for control (hereinafter referred to as a control PC) 30 receives from radio base station 20 a variety of signals described hereinafter, and generates and applies control signals to radio base station 20 and SG40.

In the second embodiment a filter coefficient is measured in a factory before shipment. As such, previously the radio base station's frequency offset can be compensated for and a processing optimizing a sampling error can also be effected as a previous processing before under an ideal condition the filter coefficient measurement can be performed.

As a first stage of the previous processing, a frequency offset is compensated for, as described hereinafter. Initially, from SG40 a burst modulation signal of a transmission frequency set by control PC30 is provided through 4-distributor 50 to radio base station 20 at the four antennas.

Radio base station 20, having been notified of a previously set transmission frequency from control PC30, measures a frequency offset corresponding to an offset between a received signal array-received through the four antennas and the known transmission frequency and provides a resultant measurement to control PC30.

Control PC30 generates a control signal which controls SG40 to change the transmission frequency of the burst modulation signal to compensate for the frequency offset.

Radio base station 20 again measures a frequency offset in a received signal array-received through the four antennas and provides a resultant measurement to control PC30. The control PC further controls the transmission frequency of SG40 to compensate for the frequency offset. The compensation as described above is repeated until a measured frequency offset attains no more than a predetermined value (for example of ±10 Hz). When a decision is made that the frequency offset has attained no more than the predetermined value the current frequency of SG40 is determined as a transmission frequency.

Then, as a second stage of the previous processing, a sampling error is optimized, as described hereinafter. Initially, from SG40 a burst modulation signal is provided through 4-distributor 50 to radio base station 20 at the four antennas.

Radio base station 20 subjects the received signal array-received at the four antenna to adaptive array processing to extract a received signal and measures its mean square error (MSE) and provides it to control PC30.

Control PC30 generates a control signal which controls radio base station 20 to sequentially change a timing of sampling at A/D converters (A/D converters 5–8 of FIG. 1) in radio base station 20.

Radio base station 20 again measures an MSE of a received signal at the changed timing of sampling and provides a resultant measurement to control PC30. Control PC30 further changes the timing of sampling in the radio base station, while the current received signal's MSE is measured to hold an MSE corresponding to a timing of sampling.

The MSE measurement as described above is performed within a predetermined range of timing of sampling and when an MSE attains no more than a predetermined value the current timing of sampling is held.

Figure 16:
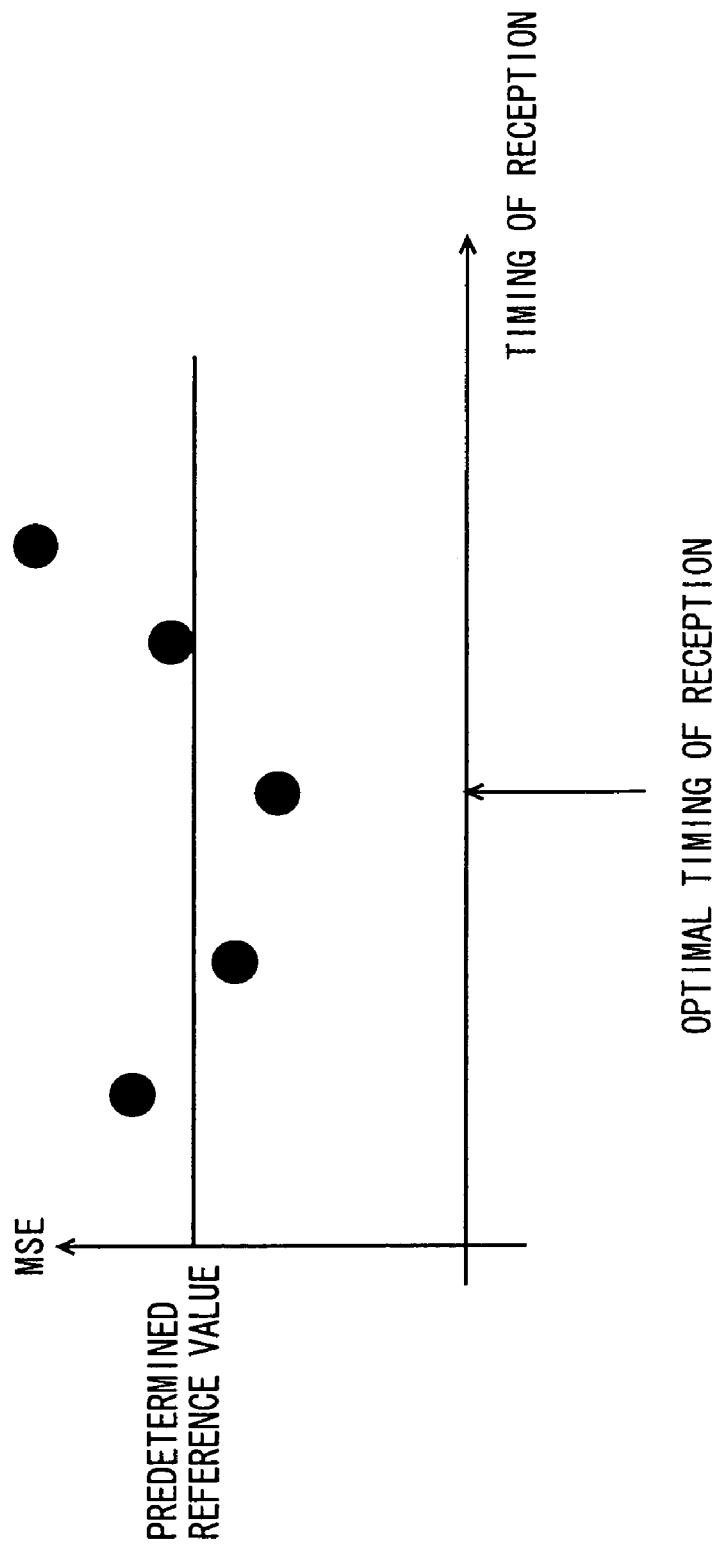
FIG. 16 is a schematic diagram for illustrating a concept of a principle of determination of a timing of reception in the second embodiment.

FIG. 16 schematically illustrates a principle of such optimization of a timing of sampling (a timing of reception). As has been described above, after a frequency offset value is optimized, in radio base station 20 a timing of sampling is assigned, as appropriate, (at five points for example) and for each assignment an MSE is measured and stored in memory.

Then, as shown in FIG. 16, when an MSE attains no more than a predetermined reference value (for example of 0.1) and also attains a minimal value, the current timing of reception (the timing corresponding to the third point in FIG. 16) is determined as an optimal timing of reception. Note that the FIG. 16 example shows that measurement of the MSE at the fourth point reveals that the third point corresponds to a minimum value. Accordingly, measurement at the fifth point would no longer be required.

The compensation of a frequency offset and the correction of a timing of sampling as described above are further repeated for confirmation, since a frequency offset value having converged at an optimal value can be changed by adjusting a timing of reception.

Thereafter, as has been described above, a burst modulation signal of a transmission frequency with a frequency offset compensated for is applied from SG40 to radio base station 20. In radio base station 20 a received signal is sampled at an optimized timing.

Under such a condition, a filter coefficient of a correction filter (correction filters 12–15 of FIG. 1) of radio base station 20 is measured.

Figure 5:
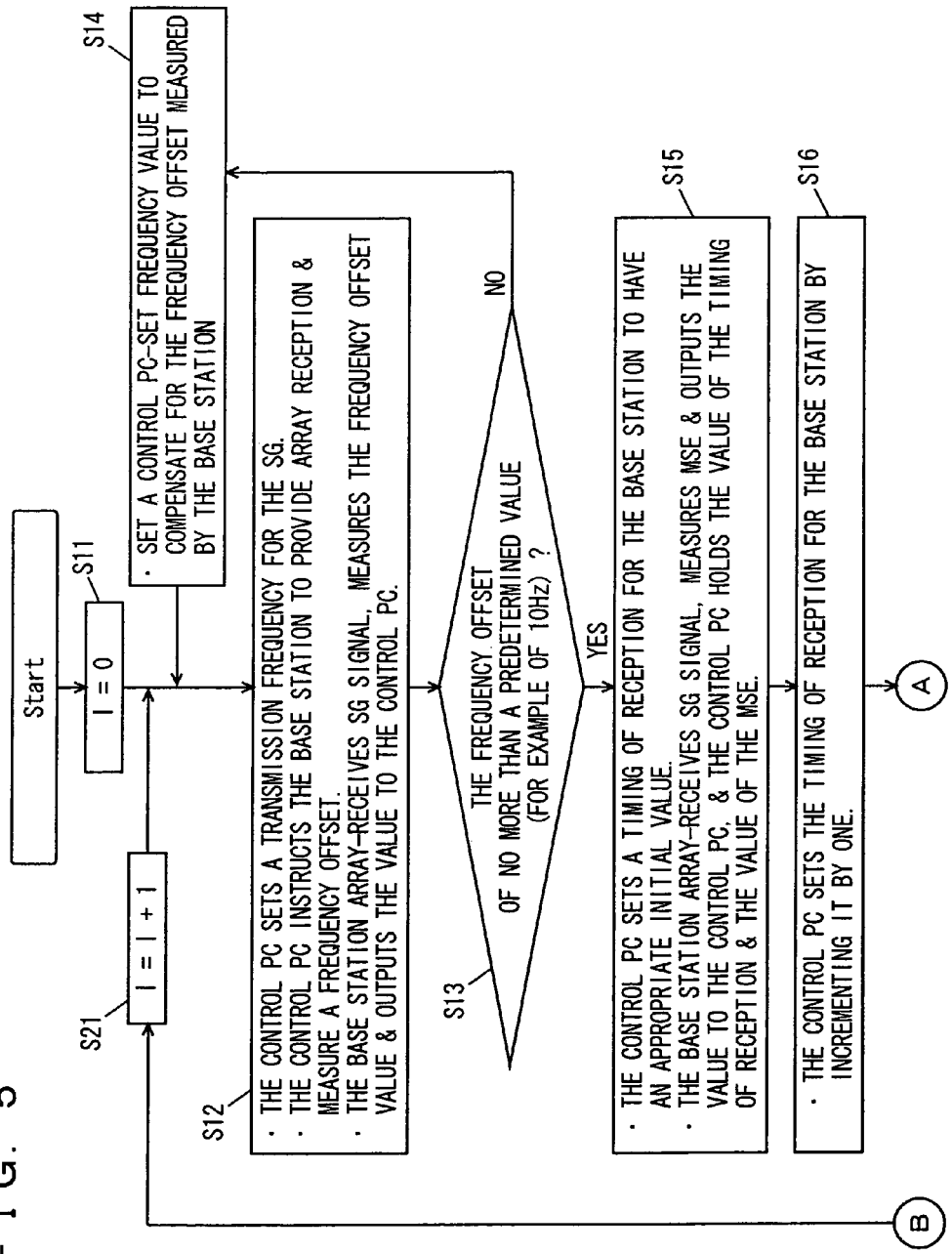
FIGS. 5 and 6 are flow charts of first and second halves, respectively, of an operation employing the FIG. 4 system configuration in the second embodiment to measure a filter coefficient before shipment.
Figure 6:
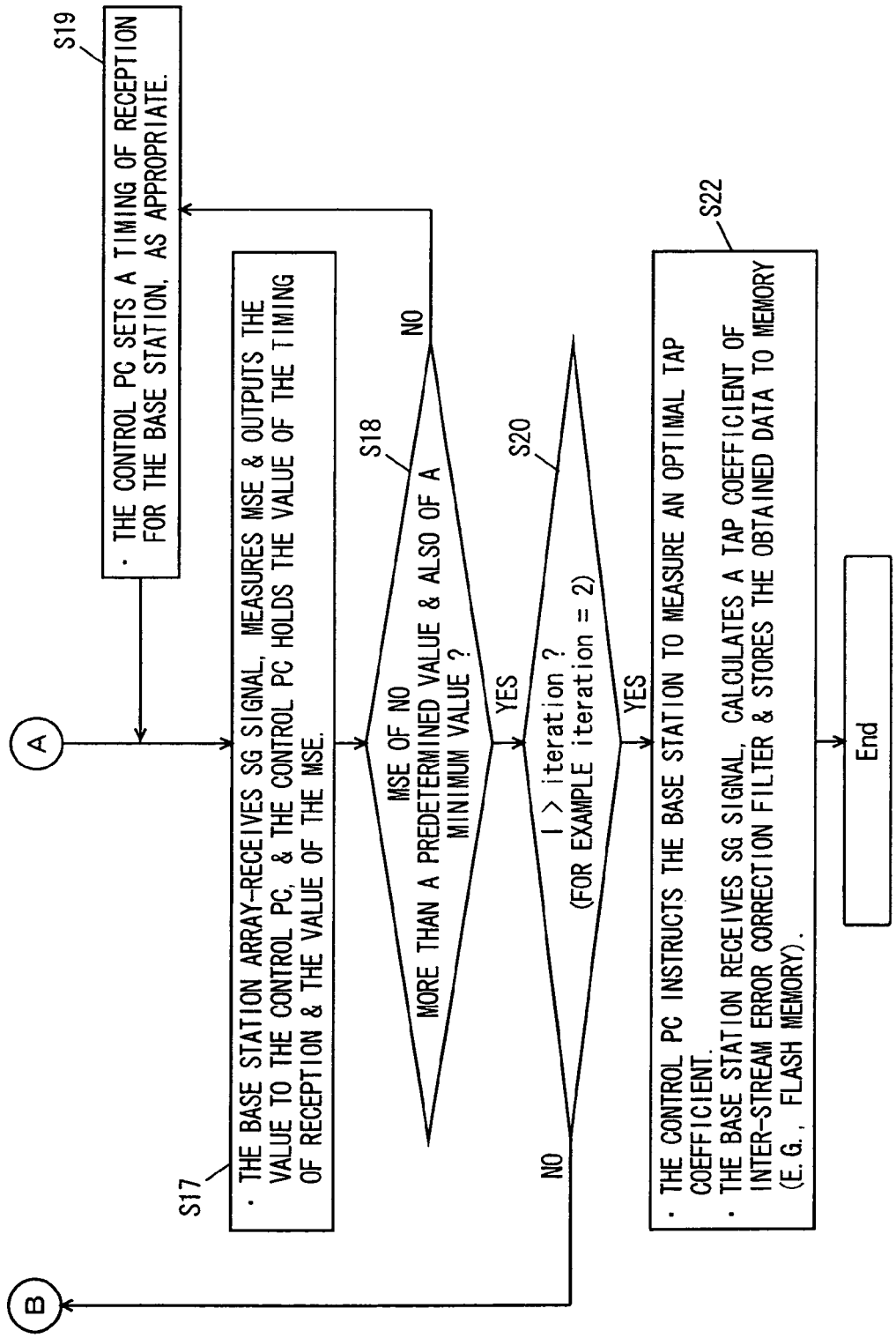

FIGS. 5 and 6 together form a flow chart of an operation employing the FIG. 4 system configuration in the second embodiment to measure a filter coefficient before shipment.

With reference to FIGS. 5 and 6, a parameter I is set to be 0 (step S1). Parameter I represents a frequency of repetition of the previous processing formed of the two steps of compensating for a frequency offset and correcting a timing of sampling.

Then control PC30 sets a transmission frequency of a burst modulation signal generated by SG40 and instructs radio base station 20 to array-receive the burst modulation signal at the four antennas and measure a frequency offset provided by the antenna. Radio base station 20 responsively array-receives the burst modulation signal from SG40, measures a frequency offset at the antenna, and transmits a resultant measurement to control PC30 (step S12).

If control PC30 does not determine that the antenna's measured frequency offset is no more than a predetermined value (for example of ±10 Hz) (step S13) control PC30 resets the transmission frequency of the burst modulation signal generated by SG40, to compensate for the frequency offset measured in base station 20 (step S14).

If control PC30 determines that the antenna's measured frequency offset is no more than the predetermined value (for example of ±10 Hz) (step S13) then control PC30 maintains the current transmission frequency of SG40, while it terminates the first step of the previous processing of the filter coefficient measurement (the compensation for a frequency offset) and shifts to the second stage thereof (the correction of a timing of sampling).

Initially, control PC30 instructs base station 20 to set a timing of reception (a timing of sampling at A/D converters 5–8 of FIG. 1) to be an appropriate timing. Radio base station 20 responsively array-receives a burst modulation signal from SG40, measures an MSE indicating a directivity convergence level in a received signal, and transmits a resultant measurement to control PC30. Control PC30 holds the current timing of sampling and the measured MSE value (step S15).

Control PC30 then instructs base station 20 to increment the timing of reception (the timing of sampling) by one (step S16).

Radio base station 20 responsively array-receives a burst modulation signal from SG40, measures an MSE in a received signal, and transmits a resultant measurement to control PC30. Control PC30 holds the current timing of sampling and the measured MSE value (step S17).

A decision is then made as to whether the measured MSE has no more than a predetermined value and also is a minimal value (step S18). If not, control PC30 instructs station 20 to further change the timing of reception (the timing of sampling) (step S19) and repeats the step S17 operation.

If at step S18 a decision is made that the MSE has no more than the predetermined value and has also attained a minimum value, control PC30 maintains the current timing of sampling in base station 20, while it terminates the second stage of the previous processing of the filter coefficient measurement (the correction of a timing of sampling) and a decision is made as to whether parameter I has attained a predetermined iteration (step S20).

If at step S20 the set iteration has not yet been attained, then at step S21 parameter I is incremented by one and the above described first stage of the previous processing (steps S12–15) and the second stage of the previous processing (steps S16–19) are repeated.

If at step S20 a decision is made that parameter I exceeds the set iteration, then at step S22 control PC30 instructs base station 20 to measure an optimal filter coefficient (tap coefficient). Accordingly, SG40 is instructed by control PC30 to generate a burst modulation signal of a transmission frequency provided when a frequency offset attains no more than a predetermined value, and base station 20 samples this signal at an optimized timing.

At step S22, from a signal array-received by base station 20 under such a condition as above a correction filter's optimal filter coefficient (tap coefficient) is calculated and a resultant calculation is held in a memory, a flash memory for example (not shown). The calculated filter coefficients are fed as a corresponding correction filter's tap coefficients $W_N$, $W_{N-1}, \ldots, W_1, W_0, W_{-1}, \ldots, W_{-N+1}, W_{-N}$ to the correction filter's multipliers Ms to provide filtering for compensating for an error of a characteristic between signal streams. The calculation of a tap coefficient of a correction filter will be described later.

Thus in the second embodiment a plurality of correction filters (digital filters) can be provided with filter coefficients accurately determined for example prior to shipment of a radio apparatus under an ideal condition with a frequency offset compensated for and a timing of sampling corrected, so that distortion of an input waveform can more accurately be compensated for.

THIRD EMBODIMENT

As has been described above, filter coefficients can be measured in a radio base station having been shipped from a factory and in operation. More specifically, even if before shipment the method described in the second embodiment is employed to measure filter coefficients in the factory precisely, after the installation as an analog RF circuit has its parts altering over years and the environment also changes, an error of a characteristic between signal streams can change. Accordingly, it is necessary to re-measure filter coefficients (tap coefficients) of a correction filter of the base station regularly at intervals corresponding to a period of time (once a year for example).

Figure 7:
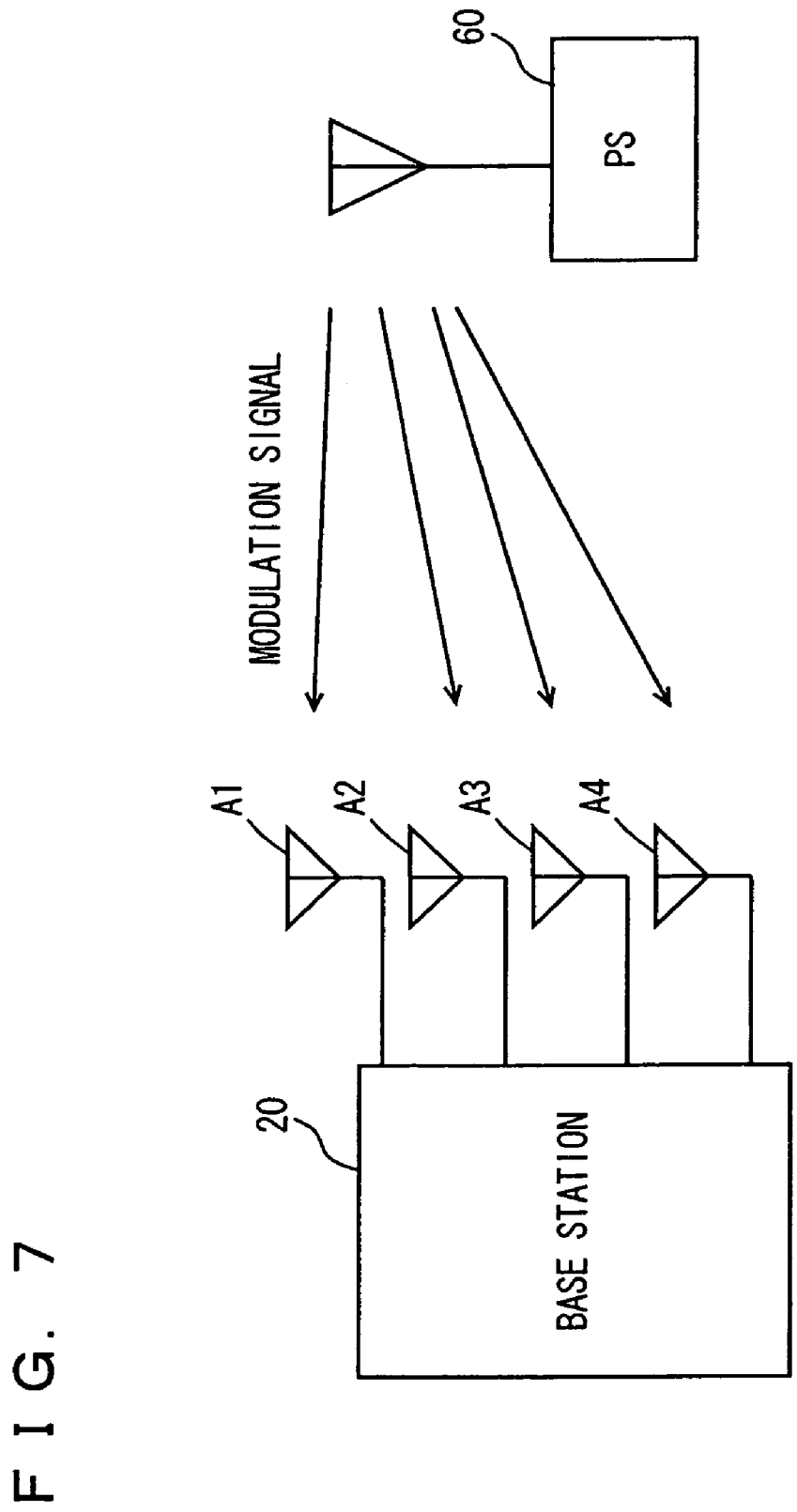
FIG. 7 is a schematic block diagram showing a configuration of a system in accordance with the present invention in a third embodiment for measuring a filter coefficient after shipment of a radio base station.

FIG. 7 is a schematic block diagram showing a configuration in the third embodiment for measurement of a filter coefficient after the radio base station is shipped.

With reference to FIG. 7, after the shipment it is impossible that control PC30 and SG40 are prepared and by a signal of a known transmission frequency a direct array reception is effected, as has been described with reference to FIG. 4 in measurement prior to shipment.

Accordingly, after the shipment the previous processing for filter measurement (i.e., the compensation for a frequency offset and the correction of a timing of sampling) cannot be performed. Accordingly, base station 20 of interest communicating with a mobile terminal 60 receives a signal therefrom at antennas A1–A4 and of the received signals a signal of high precision that satisfies a predetermined condition is selected as a signal having undergone such a previous processing as described above and from the signal filter coefficients are calculated.

The above predetermined condition includes that: (1) a frequency offset is no more than a predetermined value (for example of 10 Hz); (2) an MSE indicating a directivity convergence level is no more than a predetermined value (for example of $10^{-4}$) (i.e., there is not a substantial sampling error); (3) a reception level has a value within a predetermined range (for example of 40 to 60 dBuV) (i.e., there is not substantially unnecessary signal distortion); (4) in the slot of interest in communication a U-wave level has no more than a predetermined value (for example of 10 dBuV) (i.e., interference component is significantly row); and (5) a received signal having been demodulated does not have an reception error, and a received signal satisfying all or at least a portion of these conditions or criteria is used as a signal for the filter coefficient calculation.

Figure 8:
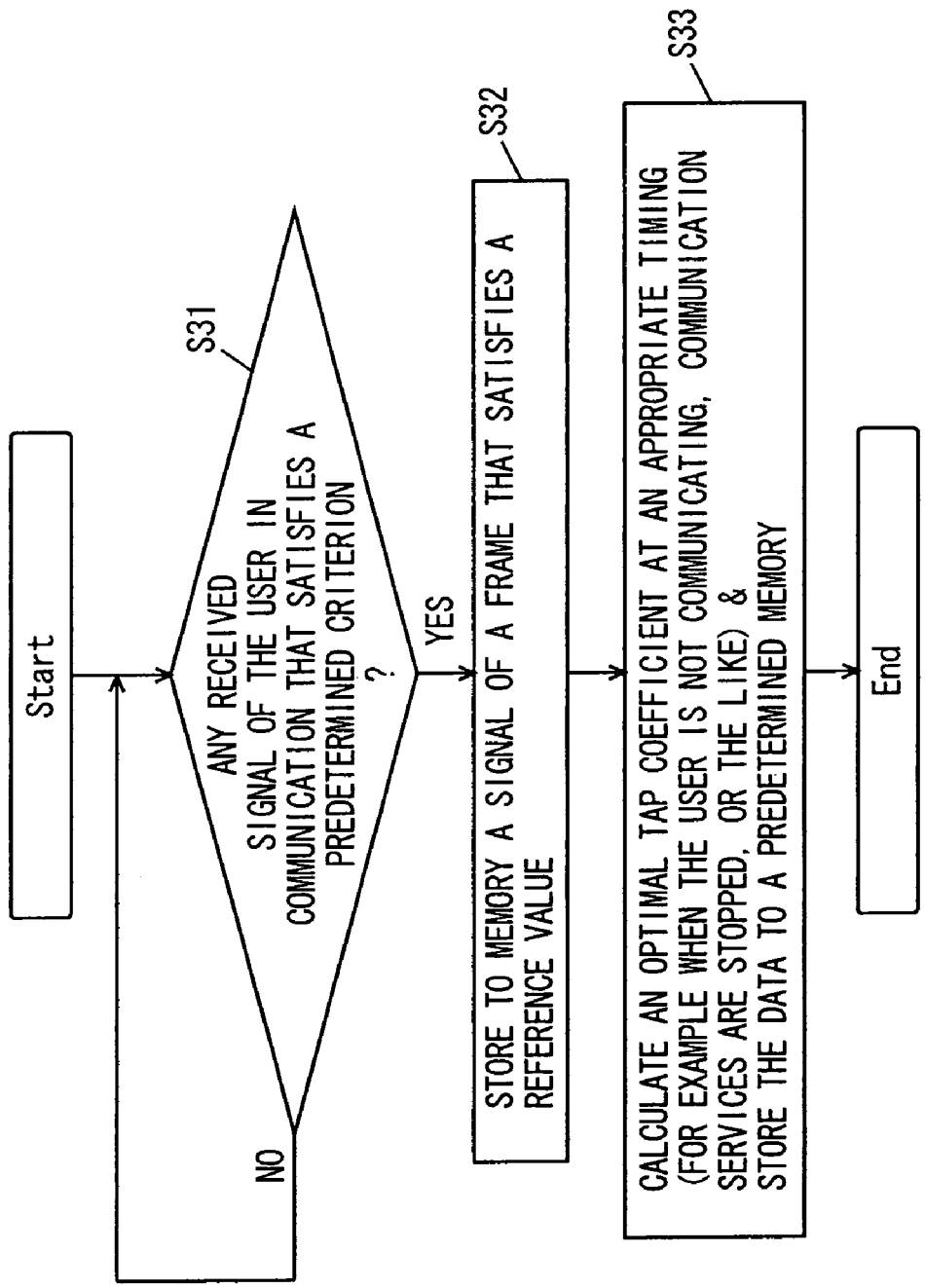
FIG. 8 is a flow chart of an operation employing the FIG. 7 system configuration in the third embodiment to measure a filter coefficient after shipment.

FIG. 8 is a flow chart of an operation employing the FIG. 7 configuration in the third embodiment to measure a filter coefficient after shipment. Note that the operation illustrated in the FIG. 8 flow chart can be implemented by a program availably downloaded through a network by a DSP of an installed base station.

Initially a decision is made whether there is a signal received from a user's terminal communicating with the base station of interest that satisfies the above described, predetermined condition (criterion) (step S31).

Then, a received signal determined at step S31 to satisfy the criterion has a frame's signal stored in memory for later filter coefficient calculation (step S32).

Then at an appropriate timing, for example when the user is not communicating or communication services are stopped, the received signal stored in memory is used to calculate a correction filter's optimal filter coefficient (tap coefficient) and store a resultant calculation to memory (not shown) (step S33).

The calculated filter coefficients are fed as a corresponding coefficient filter's tap coefficients $W_N$, $W_{N-1}, \ldots, W_1$, $W_0, W_{-1}, \ldots, W_{-N+1}, W_{-N}$ to the correction filter's multipliers to effect filtering for compensating for an error of a characteristic between signal streams. The calculation of the tap coefficients of the correction filter will be described later.

Thus in the third embodiment a plurality of correction filters (digital filter) can have filter coefficients accurately determined even in a shipped, operating radio apparatus by selecting a satisfactory signal received from a mobile terminal and using the signal for calculation so that distortion of an input waveform can more accurately be compensated for.

Hereinafter the calculation of a filter coefficient (tap coefficient) in the second and third embodiments will be described.

Figure 9:
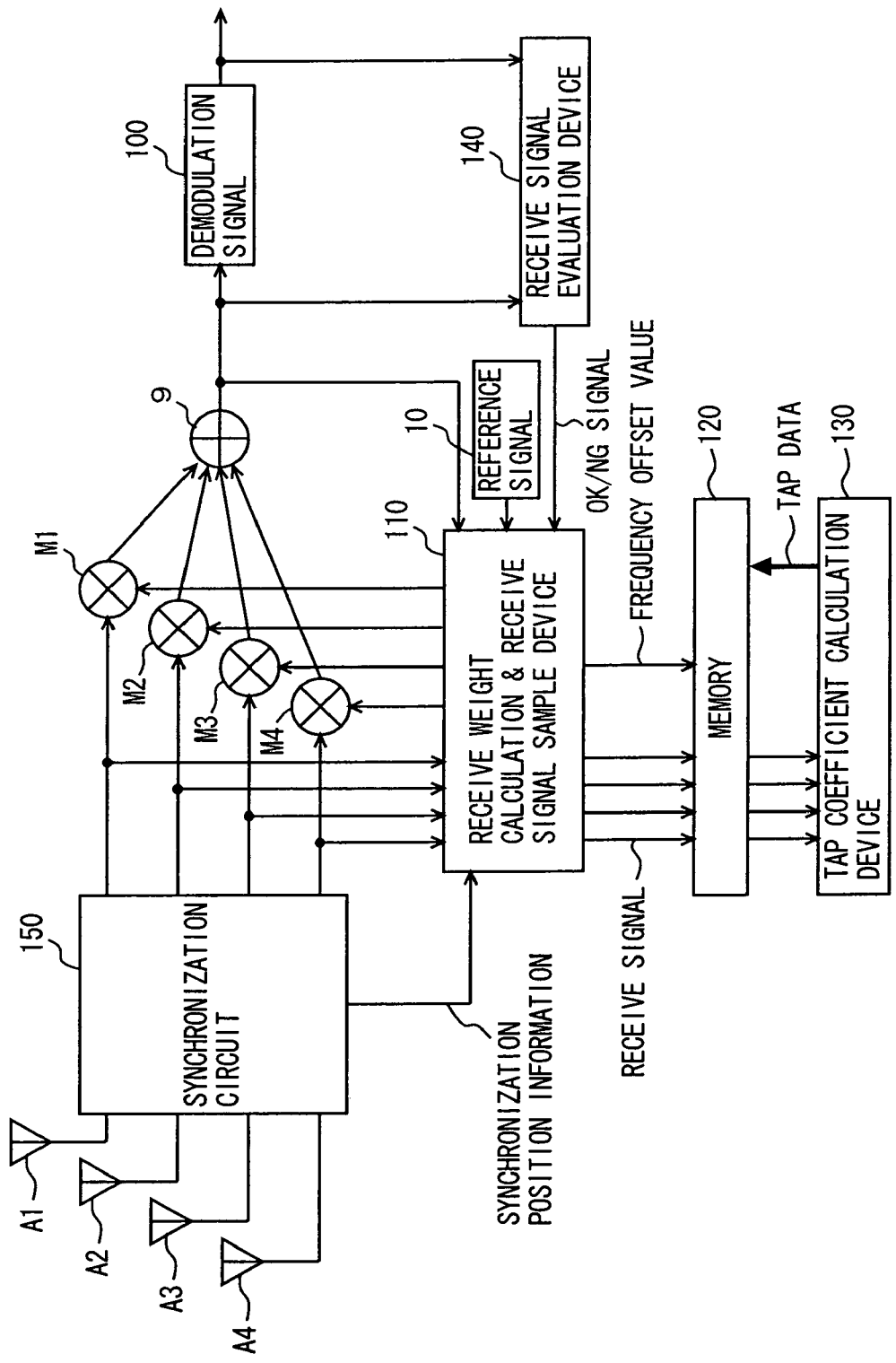
FIG. 9 is a functional block diagram showing a configuration of a system of a radio base station in accordance with the present invention in the second or third embodiment for measuring a filter coefficient.

FIG. 9 is a functional block diagram showing a configuration of a system of a radio base station that is necessary in the second or third embodiment for measuring a filter coefficient. The FIG. 9 configuration is implemented by a DSP by software.

In measuring a filter coefficient, a signal for one frame received from SG40 of FIG. 4 or terminal 60 of FIG. 7 at antennas A1–A4 is fed to a synchronization circuit 150 collectively representing a circuit configuration of A/D converters 5–8 of FIG. 1 that is involved in determining a timing of sampling. Synchronization circuit 150 provides a reception weight vector calculation and receive signal sample device 110 with synchronization position information regarding a timing of sampling. This information is used in the aforementioned correction of a timing of sampling.

On the other hand, a received signal via synchronization circuit 150 is fed to multipliers M1–M4 for adaptive array processing and also to reception weight vector calculation and receive signal sample device 110, and the received signal's frequency offset is calculated and stored to a memory 120. This information is used in the aforementioned compensation for a frequency offset.

The received signal output from adder 9 by the adaptive array processing is fed to a receive signal evaluation device 140 and also demodulated by a demodulation circuit 100 to bit data. Demodulation circuit 100 provides a demodulated output which is in turn exactly fed and also output to receive signal evaluation device 140.

Receive signal evaluation device 140 receives a signal before demodulation by demodulation circuit 100, measures an MSE (a sampling error) and determines whether a predetermined criterion is satisfied, and it also receives the signal having been demodulated by demodulation circuit 100 and determines whether the demodulated signal has an reception error. If these decisions reveal that the received signal satisfies the predetermined criterion an OK signal is generated and if not then an NG signal is generated and output to reception weight vector calculation and receive signal sample device 110. The received signal for one frame is held in memory 120 via reception weight vector calculation and receive signal sample device 110 and if a decision is made that the received signal satisfies the above described predetermined criterion then the signal is fed to a tap coefficient calculation device 130 of the present invention.

Hereinafter from a received signal tap coefficients are calculated by tap coefficient calculation device 130.

Figure 10:
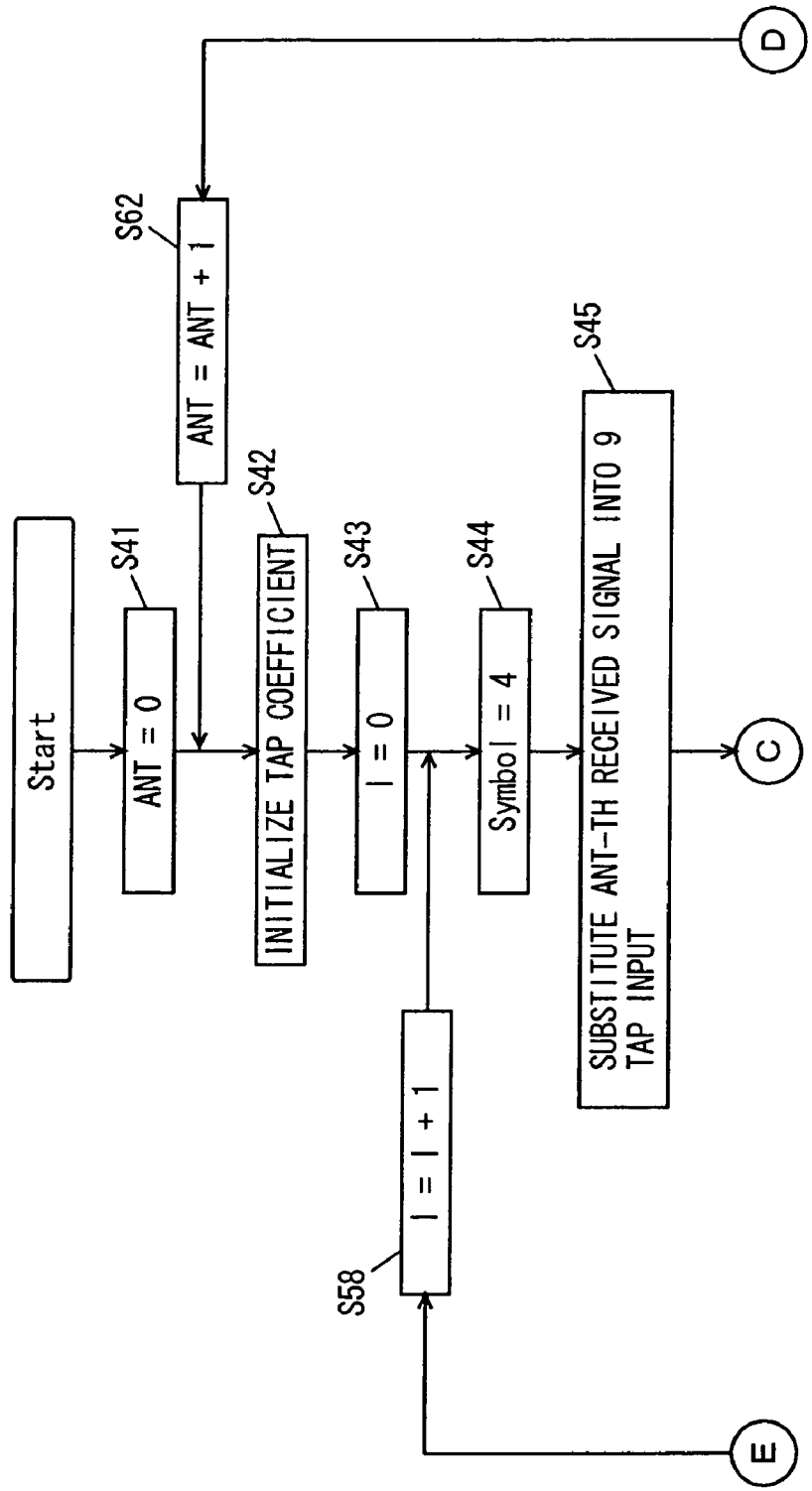
FIGS. 10–12 are flow charts of first to third stages, respectively, of an operation employing the FIG. 9 system configuration in the second or third embodiment to measure a filter coefficient.
Figure 11:
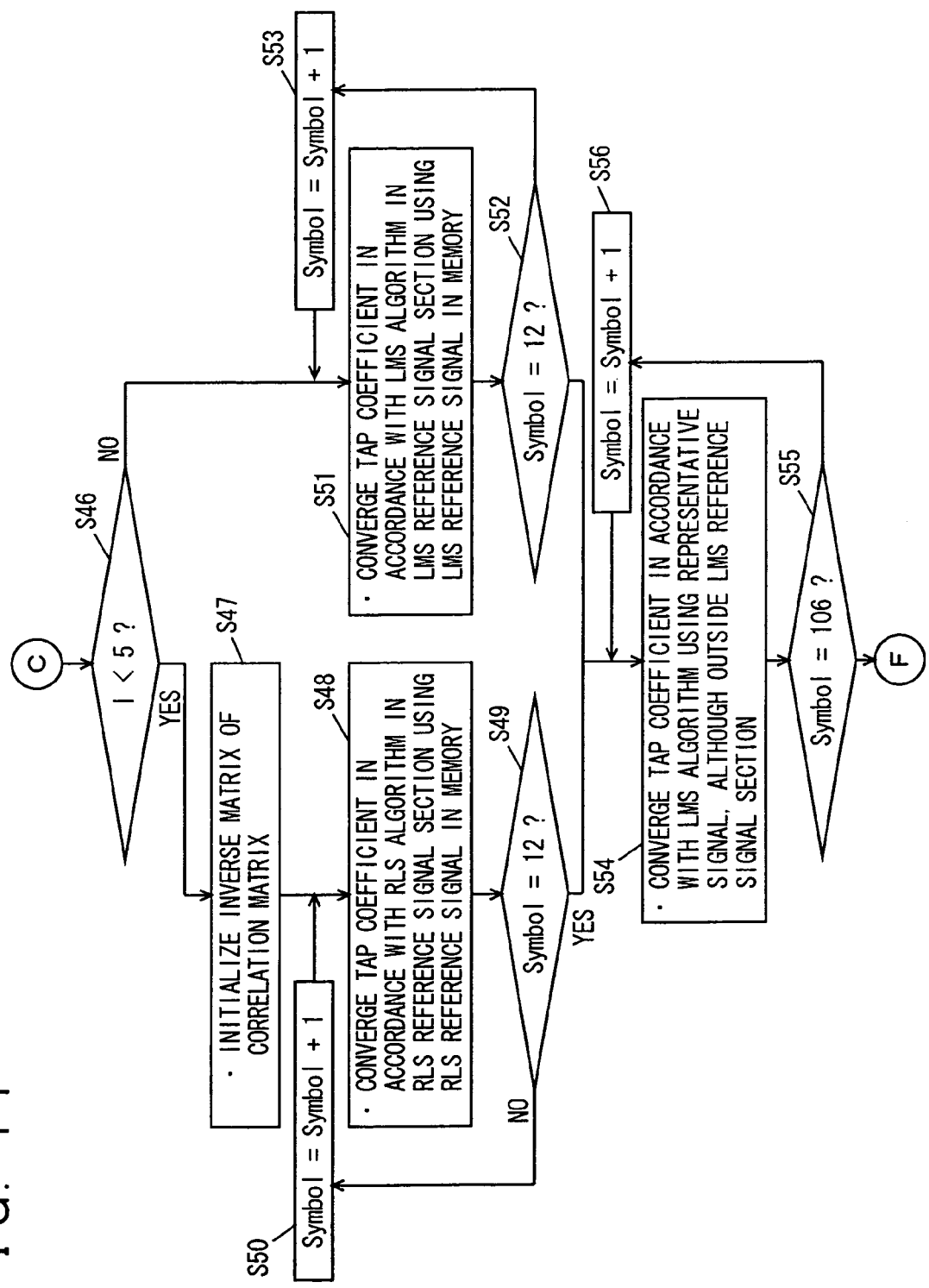
Figure 12:
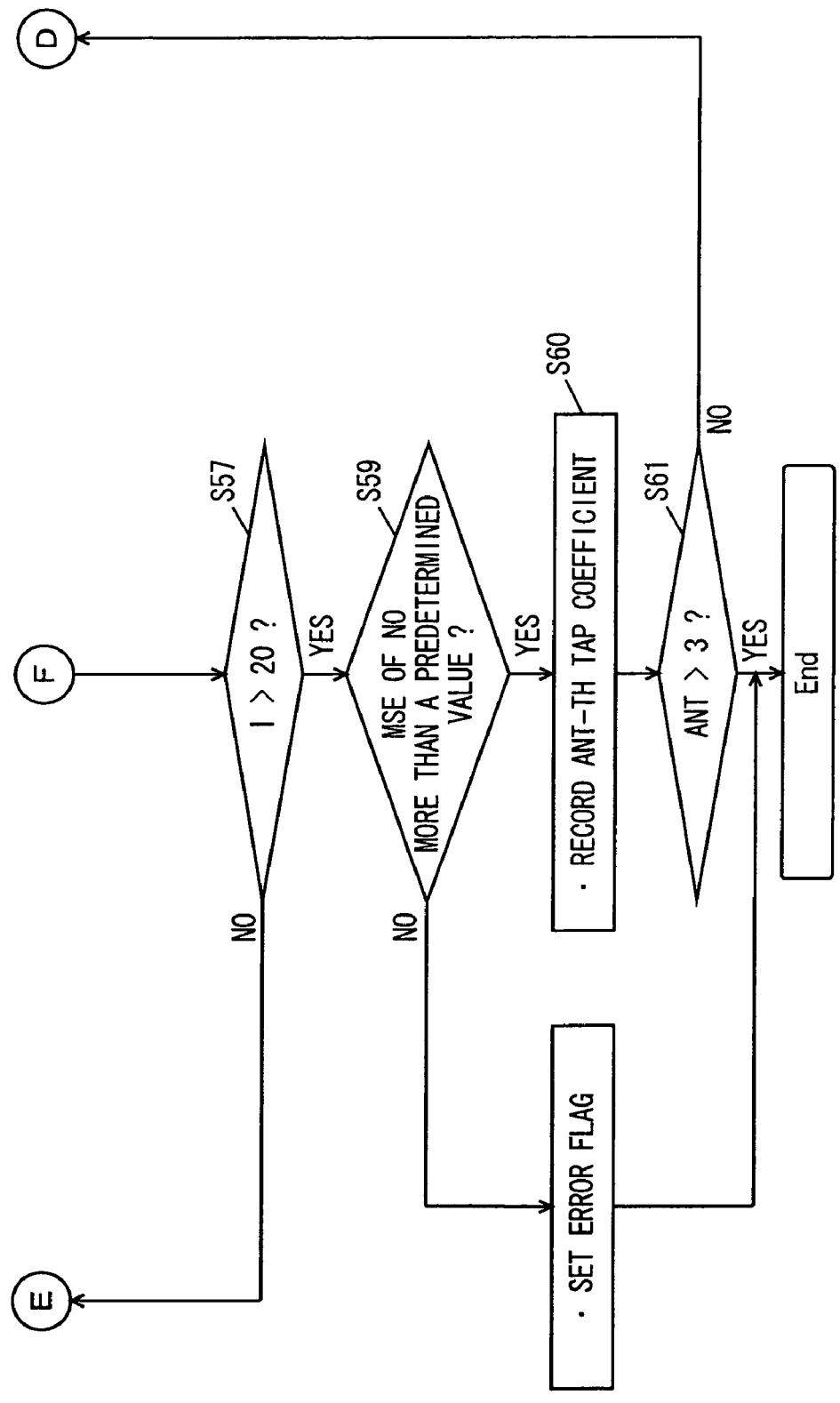

FIGS. 10–12 together provide a flow chart of an operation employing the FIG. 9 system configuration in the second or third embodiment to measure a filter coefficient.

In the following description, four antennas are used and a correction filter (digital filter) serving as a subject is provided with nine taps.

With reference to FIG. 10 a parameter ANT is set to be 0 (step S41). Parameter ANT designates an antenna signal stream corresponding to a correction filter for which filter coefficients should be calculated (step S41).

Then, nine tap coefficients to be calculated are initialized for example to be 0 (step S42).

Then, parameter I is set to be 0 (step S43). Parameter I designates a number of repetition of a filter coefficient calculation.

Then, a counter Symbol counting the number of symbols of a received signal is set to be four (step S44).

Basically, the configuration calculating a sum of multiplications of tap outputs by tap coefficients of such a digital filter (an FIR filter) as shown in FIG. 2 is analogous to a configuration calculating a sum of multiplications of input signals by a weight vector for adaptive array processing.

Furthermore, the tap coefficients are calculated so that they are updated to reduce a difference between a received signal filtered by a digital filter and output therefrom and an output of a filter having an ideal filtering characteristic. Such a calculation principle is a principle similar to an adaptive array converging a reception weight vector.

Figure 14:
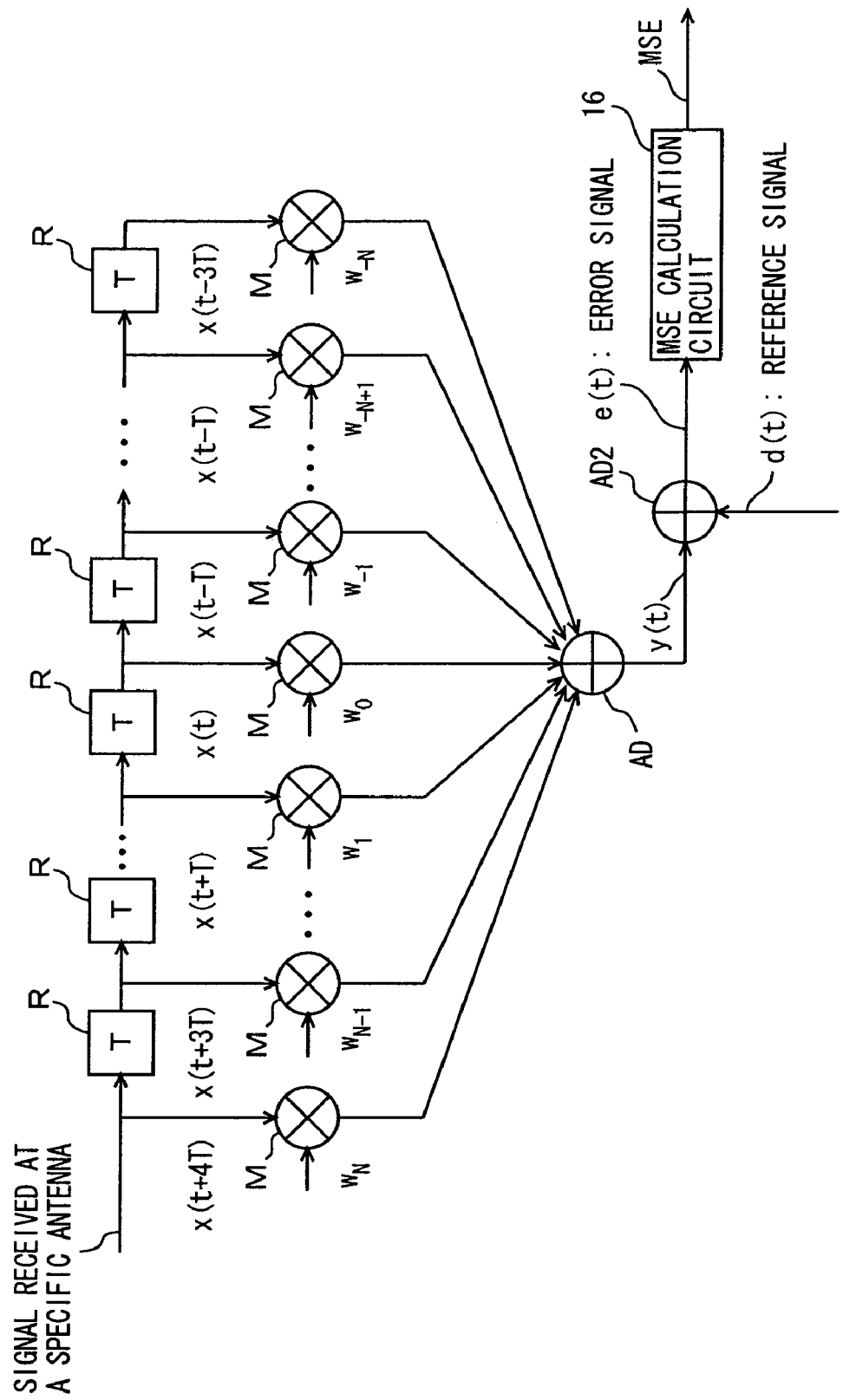
FIG. 14 is a block diagram showing a configuration of an adaptive array for calculating a tap coefficient.

More specifically, FIG. 14 is a block diagram showing a configuration of an adaptive array for calculating a tap coefficient. The FIG. 14 configuration corresponds to the configuration of the digital filter shown in FIG. 2 plus the following:

More specifically, when y(t) represents a filter output corresponding to a sum of multiplications output from an adder AD and d(t) represents a known reference signal stored in memory (memory 10 of FIG. 9), an error signal e(t)=y(t)−d(t) is calculated by an adder AD2 and fed to an MSE calculation circuit 16.

MSE calculation circuit 16 calculates an MSE of error signal e(t) and the adaptive array changes a weight (a tap coefficient), as appropriate, to minimize the MSE.

As such, a digital filter for example with nine taps can be regarded as an adaptive array with nine input streams, and such an adaptive array will be referred to as a 9-tap adaptive array for the sake of convenience.

In the embodiments of the present invention a signal of one frame of a received signal is used to calculate filter coefficients. The fact that there are nine taps, as described above, means that a symbol number 4 serving as a center, and the preceding (past) four symbols and the following (future) four symbols for a total of nine symbols are set as tap inputs.

Figure 15:
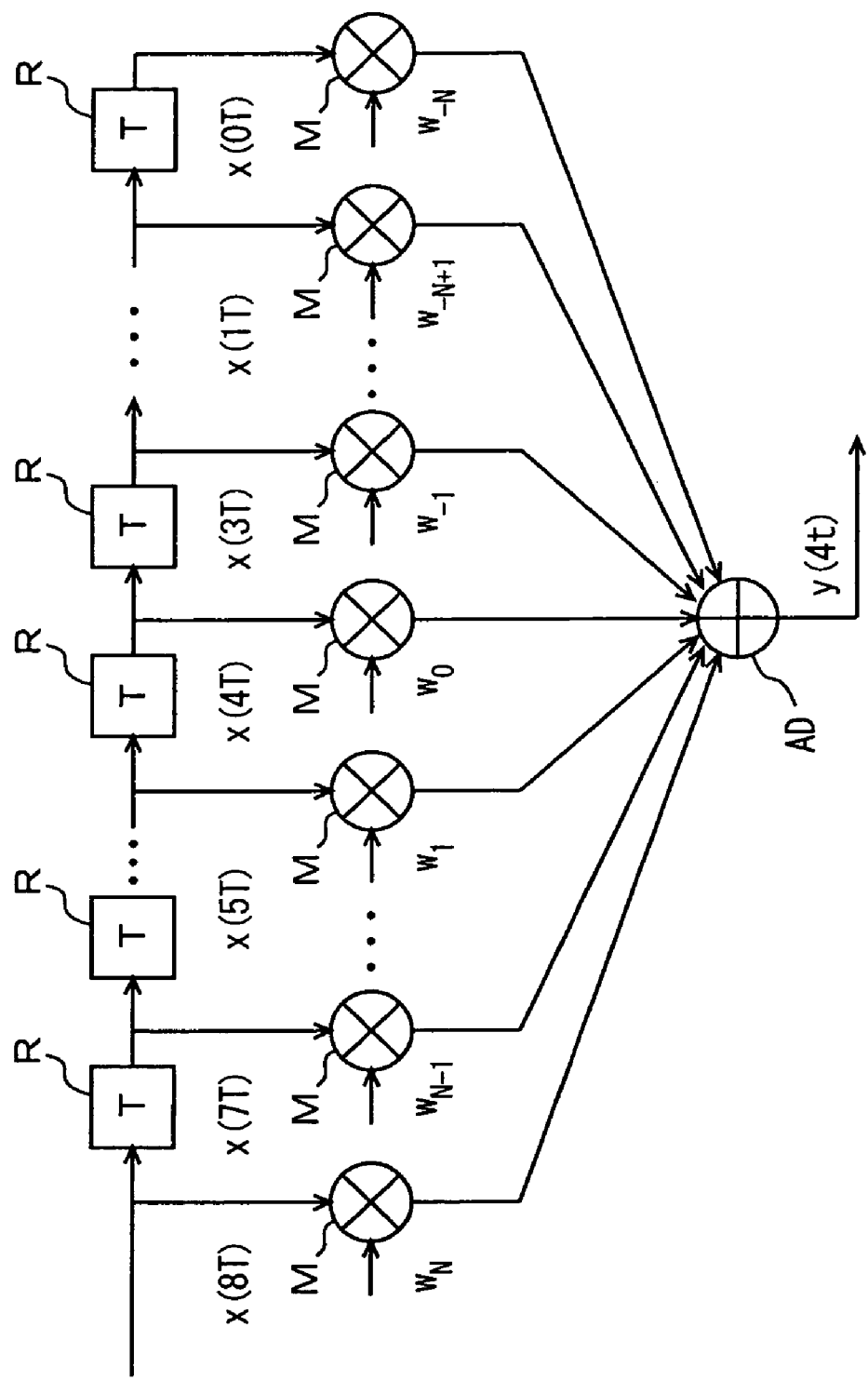
FIG. 15 is a block diagram showing a state of the FIG. 14 adaptive array starting to calculate a tap coefficient.

FIG. 15 is a block diagram of the FIG. 14 adaptive array when a tap coefficient calculation starts. By entering the t of the center tap output x(t) of FIG. 14 from 4T (x(4T) of FIG. 15), a signal x(0T) enters the most rightward tap and a signal x(8T) enters the most leftward tap. Thus a filter output of y(4T) is obtained. Accordingly in step S44 counter Symbol counting the number of symbols of a received signal is set to four and from t=4T the tap coefficient calculation starts.

Herein if an attempt should be made to output a filter output y(3T) then t=−T needs to be entered to the most rightward tap. However, −T does not exist and y(3T) cannot be output. As such for t=0 to 3T no filter output can be obtained and accordingly from t=4T the calculation starts.

In accordance with the counter's counted value a receive signal symbol of 0T to 8T of the signal stream of the antenna of interest designated by ANT is input to a filter by nine taps (step S45).

The adaptive array's reception weight vector calculator uses an minimum mean square error (MMSE) based on a square of an error to update a weight, i.e., provide a weight learning. More specifically, the reception weight vector calculator em ploys weight updating algorithms for example the aforementioned RLS algorithm employing the MMSE, as well as a least mean squares (LMS) algorithm.

The weight updating algorithm is categorized mainly into the following two types: the first weight updating algorithm, such as the RLS algorithm, iterates a calculation less frequently so that a weight converges rapidly and a targeted value is rapidly approached (for example with approximately 10 symbols a weight converges). However, it is more susceptible to noise and other disturbance. By contrast, the second weight updating algorithm, such as the LMS algorithm, iterates a calculation more frequently so that a weight converges slowly and a long period of time is required before a targeted value is arrived at (converging a weight requires a large number of symbols (e.g., approximately 100 symbols)). However, it is less susceptible to noise and other disturbance.

Such an adaptive array's processing technique using the MMSE and the RLS and LMS algorithms using the MMSE are well known techniques, as has been described previously, and disclosed by Nobuyoshi Kikuma, Adaptive Signal Processing by Array Antenna, Kagaku Gijutsu Shuppan, pp. 35–49, "Chapter 3 MMSE Adaptive Array," as has been mentioned previously. Accordingly, they will not be described herein.

Although the algorithms are such different as described above, weights minimizing (nulling) an MSE of an error signal in the FIG. 14 adaptive array converge generally at a single value.

In the present embodiment a tap coefficient is calculated by a method initially using both the RLS and LMS algorithms to allow a weight (a tap coefficient) to rapidly approach a targeted value and then using the LMS algorithm to allow the weight to slowly converge at the targeted value. Using a 9-tap adaptive array, a weight is converged each time to minimize an MSE, and a finally determined one is adopted as a tap coefficient of a correction filter.

Accordingly in step S46 a decision is made as to whether iteration I has reached five. If not an adaptive array processing with the RLS and LMS algorithms alternately switched is employed to calculate a filter coefficient. If iteration I is five or more then an adaptive array processing by the LMS algorithm alone is employed to calculate a filter coefficient.

More specifically, if iteration I is less than five (step S46) a 9-tap adaptive array processing by the RLS and LMS algorithms is performed to provide a rapid convergence at an optimal tap coefficient.

Initially at step S47 a correlation matrix's inverse matrix is initialized and then at step S48 an RLS reference signal is used to allow the RLS algorithm to converge a tap coefficient. This is repeated until a decision is made at step S49 that the number of symbols of a received signal has attained 12 (i.e., within an RLS reference signal section). More specifically, it is repeated while at step S50 the number of symbols is incremented by one (an input to the 9-tap adaptive array is shifted by one symbol).

If a decision is made at step S49 that the number of symbols has arrived at 12 then until a decision is made at step S55 that the number of symbols has arrived at 106 the number of symbols is incremented by one (step S56), while a processing in an LMS reference signal-free section of the 9-tap adaptive array is provided (step S54).

In this section, a reference signal held in memory 10 is not used and, as described hereinafter, the LMS algorithm is used to converge a tap coefficient.

Typically, a signal used for example by the PHS for communication has a true signal point at any of signal reference points of π/4 shift quadrature phase shift keying (QPSK) at each symbol point at any time. However, a received signal's I, Q phase does not converge at a π/4 shift QPSK signal reference point due to interference or the like.

As has been described above, in a section of a received signal that has a reference signal the received signal and the reference signal are used to effect a weight learning. In a section free of a reference signal, a phase difference between a sum of complex multiplications of a received signal by a weight vector calculated one symbol before and a π/4 shift QPSK signal reference point is used as an error in providing a weight learning.

Accordingly, the reference signal is calculated by a reverse operation from the weight vector one symbol before, and from the signal point's I, Q signal a shortest π/4 shift QPSK signal point is selected and signal d(t) is brought to the signal reference point. As the reference signal thus obtained is used in place of a reference signal previously held in memory, it will be referred to as a representative signal for the sake of illustration. At step S54, although outside the LMS reference signal section, such a representative signal d(t) is used to allow the LMS algorithm to converge a tap coefficient.

Note that adaptive array processing outside such a reference signal section is specifically described for example in Japanese Patent Laying-Open No. 2001-144825. Accordingly it will not be described.

Then if a decision is made at step S55 that the number of symbols has arrived at 106 then a decision is made at step S57 whether iteration I exceeds 20 and if not then at step S58 iteration I is incremented by one and step S44 and the subsequent steps are repeated.

In particular, if a decision is made at step S46 that iteration I is five or more then the 9-tap adaptive array processing only by the LMS algorithm is used to provide convergence at an optimal tap coefficient.

Initially at step S51 an LMS reference signal is used and the LMS algorithm is employed to converge a tap coefficient. This is repeated until a decision is made at step S52 that the number of symbols of a received signal has attained 12 (i.e., within an LMS reference signal section). More specifically, it is repeated while at step S53 the number of symbols is incremented by one (an input to the 9-tap adaptive array is shifted by one symbol).

If a decision is made at step S52 that the number of symbols has arrived at 12 then until a decision is made at step S55 that the number of symbols has arrived at 106 the number of symbols is incremented by one (step S56), while a processing in an LMS reference signal-free section of the 9-tap adaptive array is provided (step S54).

In this section, the above representative signal d(t) is used and the LMS algorithm is employed to converge a tap coefficient.

Then if a decision is made at step S55 that the number of symbols has arrived at 106 then a decision is made at step S57 whether iteration I exceeds 20 and if not then at step S58 iteration I is incremented by one and step S44 and the subsequent steps are repeated.

If a decision is made at step S57 that iteration I exceeds 20 then a decision is made as to whether an MSE with error signal e(t) calculated is no more than a predetermined value (step S59). If so then at step S60 a finally converged filter coefficient of a signal stream of the antenna of interest is recorded and until a decision is made at step S61 that parameter ANT identifying an antenna exceeds three, at step S62 parameter ANT is incremented by one, while for all antenna signal paths a tap coefficient is calculated and recorded.

Thus for all of the four antenna signal paths filter coefficients are calculated.

If despite I exceeding 20 a decision is made at step S59 that an MSE is not no less than a predetermined value, a decision is made that tap coefficient convergence has failed and at step S66 an error flag is set and at that time point the tap coefficient calculation is terminated.

Figure 13:
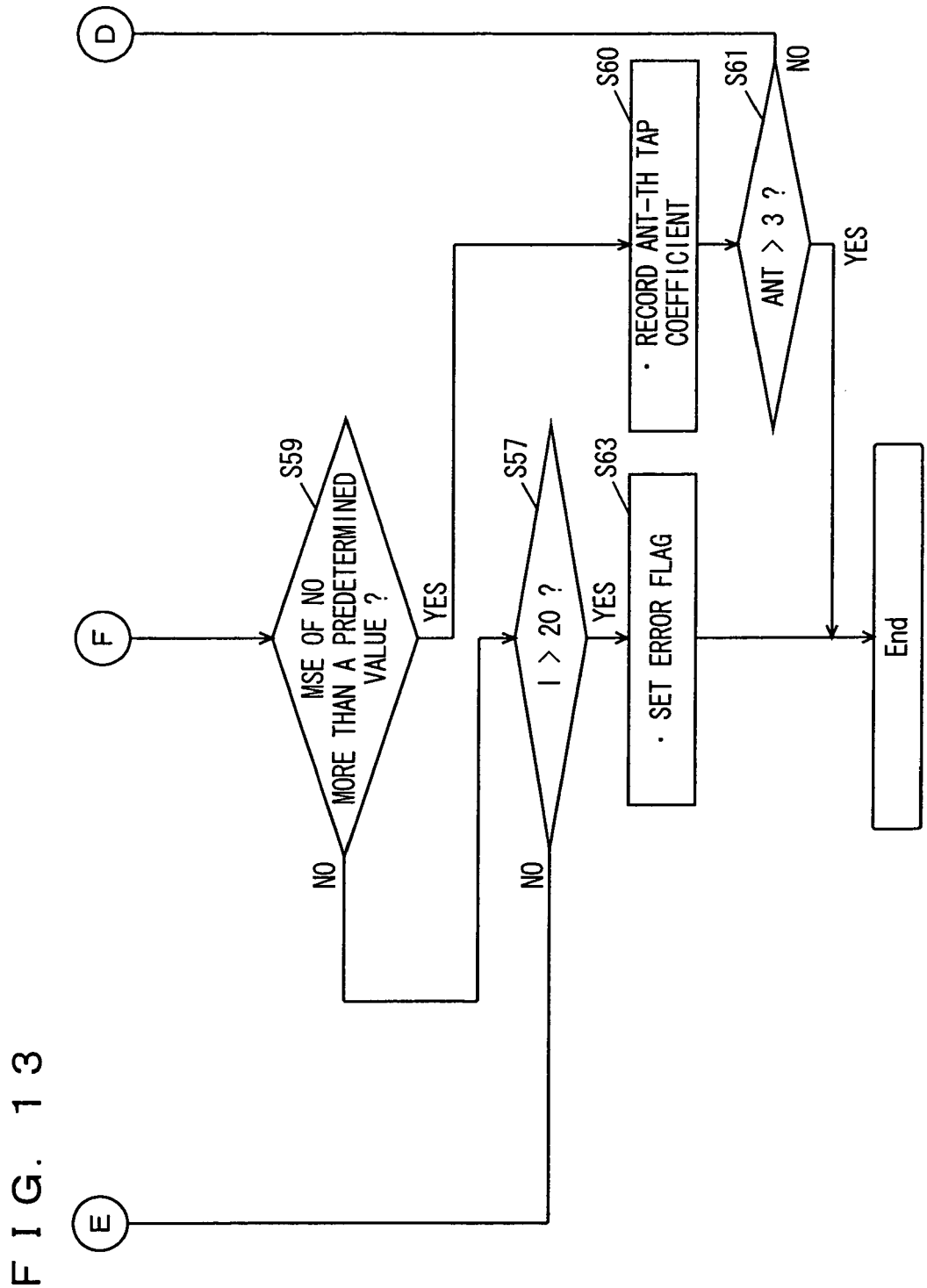
FIG. 13 is a flow chart of an exemplary variation of the third stage of the operation represented in FIG. 12.

FIG. 13 shows an exemplary variation of a method of calculating a tap coefficient shown in FIGS. 10–12. This exemplary variation is a partial variation of the FIG. 12 processing and the remainder is the same as described with reference to FIGS. 10 and 11 and accordingly will neither shown or described.

FIG. 13 corresponds to FIG. 12, except that the former includes the latter's steps S57 and S59 switched in order. More specifically, in the FIG. 13 example, the step S57 decision on whether iteration I exceeds 20 is preceded by the step S59 decision on whether an MSE is no more than a predetermined value. More specifically, if I is less than 20 and an MSE is sufficiently small, i.e., a weight (a tap coefficient) sufficiently converges, then without waiting for I to exceed 20 the process exits the I iteration loop and at step S60 a finally converged tap coefficient is recorded.

Then until a decision is made at step S61 that parameter ANT identifying an antenna exceeds three, at step S62 parameter ANT is incremented by one, while for all antenna signal paths a tap coefficient is calculated and recorded.

If at step S59 a decision is not made that an MSE is no more than the predetermined value and in addition at step S57 I exceeds 20 then a decision is made that tap coefficient convergence has failed and at step S63 an error flag is set and at that time point the tap coefficient calculation is terminated.

Thus in accordance with the present invention in a radio apparatus a plurality of filter means digitally compensating for a difference of a characteristic between a plurality of analog circuits subjecting a signal received at a plurality of antennas to an analog processing can be provided subsequent to a corresponding to analog-digital converter so that distortion in waveform of an input to a digital signal extraction means can be compensated for to prevent the digital signal extraction means from having an impaired ability to reduce an interference component.

Furthermore in accordance with the present invention a plurality of filter means digitally compensating for a difference of a characteristic between analog circuits can be provided with a filter coefficient accurately determined for example prior to shipment of a radio apparatus under an ideal condition with a frequency offset compensated for and a timing of sampling corrected so that an input waveform's distortion can more accurately be compensated for.

Furthermore in accordance with the present invention a plurality of filter means digitally compensating for a difference of a characteristic between analog circuits can be provided with a filter coefficient accurately determined in a shipped and installed radio apparatus by selecting a satisfactory signal received from a mobile terminal and using the selected signal for calculation.

INDUSTRIAL APPLICABILITY

In accordance with the present invention a difference of a characteristic between a plurality of analog circuits can digitally be compensated for so that the present invention is useful in a radio apparatus subjecting a signal received at a plurality of antennas to an analog processing.

The invention claimed is:

1. A radio apparatus using a plurality of antennas to receive a signal, comprising:
   a plurality of analog circuits provided to correspond to said plurality of antennas and subjecting signals received at said plurality of antennas, respectively, to an analog signal processing;
   a plurality of analog-digital converters receiving signals from said plurality of analog circuits, respectively, to convert said signals to digital signals;
   a plurality of filter units receiving said digital signals from said plurality of analog-digital converters, respectively, to filter said digital signals to compensate for distortion in waveform resulting from a difference of a characteristic between said plurality of analog circuits; and
   a digital signal extraction unit receiving signals from said plurality of filter units, respectively, to subject said signals to a digital signal processing to extract a received signal.

2. The radio apparatus according to claim 1, wherein each of said plurality of filter unit is a digital filter having a characteristic to compensate for a difference between a characteristic of said analog circuit corresponding thereto and an ideal circuit characteristic.

3. The radio apparatus according to claim 2, wherein said digital filter is an FIR filter.

4. The radio apparatus according to claim 1, wherein said digital signal extraction unit is an adaptive array processing circuit employing an adaptive array processing to extract a received signal.

5. A method of receiving a signal in a radio apparatus having a plurality of antennas, said radio apparatus including a plurality of analog circuits provided to correspond to said plurality of antennas and subjecting signals received at said plurality of antennas, respectively, to an analog signal processing, and a plurality of analog-digital converters receiving signals from said plurality of analog circuits, respectively, to convert said signals to digital signals, the method comprising the step of:
   filtering said digital signals output from said plurality of analog-digital converters to compensate for distortion in waveform resulting from a difference of a characteristic between said plurality of analog circuits; and
   subjecting said filtered digital signals to a digital signal processing to extract a received signal.

6. The method according to claim 5, wherein the step of filtering is digital-filtering accompanied by a characteristic for compensating for a difference between a characteristic of said analog circuit corresponding thereto and an ideal circuit characteristic.

7. The method according to claim 5, wherein the step of subjecting is a processing employing an adaptive array processing to extract a received signal.

8. A method of measuring a filter coefficient of a radio apparatus using a plurality of antennas to receive a signal, said radio apparatus including
   a plurality of analog circuits provided to correspond to said plurality of antennas and subjecting signals received at said plurality of antennas, respectively, to an analog signal processing;
   a plurality of analog-digital converters receiving signals from said plurality of analog circuits, respectively, to convert said signals to digital signals;
   a plurality of filter units receiving said digital signals from said plurality of analog-digital converters, respectively, to filter said digital signals to compensate for distortion in waveform resulting from a difference of a characteristic between said plurality of analog circuits; and
   a digital signal extraction unit receiving signals from said plurality of filter units respectively, to subject said signals to a digital signal processing to extract a received signal, the method comprising the steps of:
   determining a transmission frequency compensating for a frequency offset in said plurality of antennas;
   determining a sampling-timing allowing a sampling error in said analog-digital converter to have an optimal value; and
   calculating a filter coefficient of said filter units from a signal of said transmission frequency determined and said sampling-timing determined.

9. The method according to claim 8, wherein each of said plurality of filter units is a digital filter having a characteristic to compensate for a difference between a characteristic of said analog circuit corresponding thereto and an ideal circuit characteristic.

10. The method according to claim 8, wherein:
    the step of determining a transmission frequency includes the steps of
    allowing a transmit signal of a variable transmission frequency to be received at said plurality of antennas,
    measuring a frequency offset of said transmit signal received at said plurality of antennas, and
    determining a transmission frequency allowing said measured frequency offset to have no more than a predetermined value; and the step of determining a sampling-timing includes the steps of allowing a transmit signal to be received at said plurality of antennas;

sequentially varying a sampling-timing at said analog-digital converter, for each said sampling-timing varied, measuring and storing a sampling error of a received signal extracted by said digital signal extraction means, and determining a sampling-timing allowing said sampling error to be minimized.

11. The method according to claim 8, wherein the step of calculating a filter coefficient includes the steps of:

allowing a signal of said determined transmission frequency to be received at each of said plurality of antennas; and subjecting a symbol of said received signal to an adaptive array processing as a tap input to calculate a filter coefficient corresponding to a respective tap input.

12. The method according to claim 8, wherein said digital signal extraction unit is an adaptive array processing circuit employing an adaptive array processing to extract a received signal.

13. A method of measuring a filter coefficient of a radio apparatus using a plurality of antennas to receive a signal, said radio apparatus including a plurality of analog circuits provided to correspond to said plurality of antennas and subjecting signals received at said plurality of antennas, respectively, to an analog signal processing, a plurality of analog-digital converters receiving signals from said plurality of analog circuits, respectively, to convert said signals to digital signals, a plurality of filter units receiving said digital signals from said plurality of analog-digital converters, respectively, to filter said digital signals to compensate for distortion in waveform resulting from a difference of a characteristic between said plurality of analog circuits, and a digital signal extraction unit receiving signals from said plurality of filter units respectively, to subject said signals to a digital signal processing to extract a received signal, the method comprising the steps of:

determining whether a signal received from a mobile terminal at said plurality of antennas satisfies a predetermined condition;

holding a signal received from a mobile terminal at said plurality of antennas, the mobile device satisfying said predetermined condition; and calculating a filter coefficient of said filter units of said signal received and held.

14. The method according to claim 13, wherein each of said plurality of filter units is a digital filter having a characteristic to compensate for a difference between a characteristic of said analog circuit corresponding thereto and an ideal circuit characteristic.

15. The method according to claim 13, wherein the step of calculating a filter coefficient includes the step of subjecting a symbol of said held, received signal to an adaptive array processing as a tap input to calculate a filter coefficient corresponding to a respective tap input.

16. The method according to claim 13, wherein said digital signal extraction unit is an adaptive array processing circuit employing an adaptive array processing to extract a received signal.

17. A program to measure a filter coefficient of a radio apparatus using a plurality of antennas to receive a signal, said radio apparatus including a plurality of analog circuits provided to correspond to said plurality of antennas and subjecting signals received at said plurality of antennas, respectively, to an analog signal processing, a plurality of analog-digital converters receiving signals from said plurality of analog circuits, respectively, to convert said signals to digital signals, a plurality of filter units receiving said digital signals from said plurality of analog-digital converters, respectively, to filter said digital signals to compensate for distortion in waveform resulting from a difference of a characteristic between said plurality of analog circuits, and a digital signal extraction unit receiving signals from said plurality of filter units respectively, to subject said signals to a digital signal processing to extract a received signal, the program causing a computer to effect the steps of:

determining whether a signal received from a mobile terminal at said plurality of antennas satisfies a predetermined condition;

holding a signal received from a mobile terminal at said plurality of antennas, the mobile device satisfying said predetermined condition; and calculating a filter coefficient of said filter units of said signal received and held.

18. The program according to claim 17, wherein each of said plurality of filter units is a digital filter having a characteristic to compensate for a difference between a characteristic of said analog circuit corresponding thereto and an ideal circuit characteristic.

19. The program according to claim 17, wherein the step of calculating a filter coefficient includes the step of subjecting a symbol of said held, received signal to an adaptive array processing as a tap input to calculate a filter coefficient corresponding to a respective tap input.

20. The program according to claim 17, wherein said digital signal extraction unit is an adaptive array processing circuit employing an adaptive array processing to extract a received signal.

* * * * *

UNITED STATES PATENT AND TRADEMARK OFFICE
CERTIFICATE OF CORRECTION

PATENT NO.         : 7,110,795 B2                                   Page 1 of 1
APPLICATION NO. : 10/487705
DATED              : September 19, 2006
INVENTOR(S)        : Yoshiharu Doi It is certified that error appears in the above-identified patent and that said Letters Patent is hereby corrected as shown below:

On the title page of the Letters Patent,

Under section "(54)", change " RADIO APPARATUS, METHOD FOR RECEIVING ITS SIGNAL, METHOD FOR MEASURING ITS FILTER COEFFICIENT, AND PROGRAM FOR MEASURING ITS FILTER COEFFICIENT " to -- RADIO APPARATUS, AND ITS SIGNAL RECEPTION METHOD AND FILTER COEFFICIENT MEASUREMENT METHOD AND PROGRAM --

Signed and Sealed this

Second Day of October, 2007

JON W. DUDAS
*Director of the United States Patent and Trademark Office*